United States Patent [19]

Robinson, Jr. et al.

[11] 4,103,674
[45] Aug. 1, 1978

[54] MODULAR SOLAR COLLECTOR SYSTEM

[75] Inventors: Glen P. Robinson, Jr., Atlanta; Samuel V. Shelton, Stone Mountain; Samuel F. Hutchins, Lilburn, all of Ga.

[73] Assignee: Scientific-Atlanta, Inc., Atlanta, Ga.

[21] Appl. No.: 746,850

[22] Filed: Dec. 2, 1976

Related U.S. Application Data

[63] Continuation-in-part of Ser. No. 660,249, Feb. 23, 1976, Pat. No. 4,074,705.

[51] Int. Cl.$^2$ .................................................. F24J 3/02
[52] U.S. Cl. ................................. 126/271; 237/1 A; 239/566; 52/406
[58] Field of Search ............... 126/270, 271; 237/1 A; 239/566, 567, 568, 550; 52/406, 407

[56] References Cited

U.S. PATENT DOCUMENTS

| | | | |
|---|---|---|---|
| 1,742,861 | 1/1930 | Johnson | 126/271 |
| 1,913,312 | 6/1933 | Lines | 52/406 |
| 2,541,428 | 2/1951 | Leo et al. | 239/566 |
| 3,270,739 | 9/1966 | Thomason | 126/271 |
| 3,584,786 | 6/1971 | Johnson | 239/568 |
| 3,943,911 | 3/1976 | Yu | 126/271 |
| 3,989,031 | 11/1976 | Thomason et al. | 126/271 |

*Primary Examiner*—Kenneth W. Sprague
*Assistant Examiner*—James C. Yeung
*Attorney, Agent, or Firm*—B. J. Powell

[57] ABSTRACT

A modular solar collector system for solar radiation with a collector assembly including a series of overlapping collector pans defining a common fluid flow channel therealong exposed to solar radiation down which a heat transfer fluid flows to be heated directly or indirectly by the solar radiation. The fluid flow channel is closed by a transparent cover, a supply header which distributes the heat transfer fluid over the fluid flow channel for flow down the channel under the force of gravity, and a return header to receive the heated fluid after passage down the channel for passage through a heat exchanger and recirculation. The disclosure also contemplates the method of fabrication and installation of the solar collector system.

44 Claims, 24 Drawing Figures

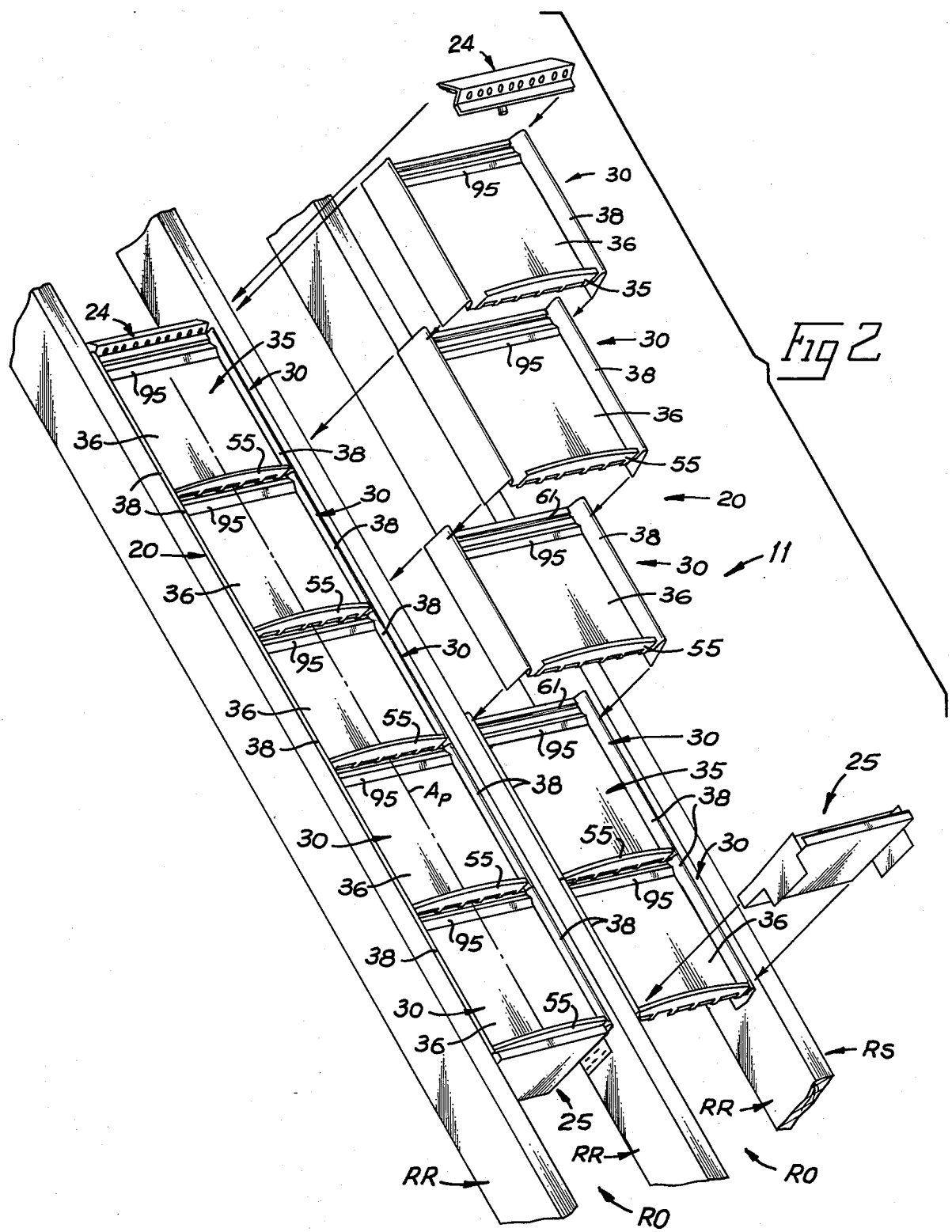

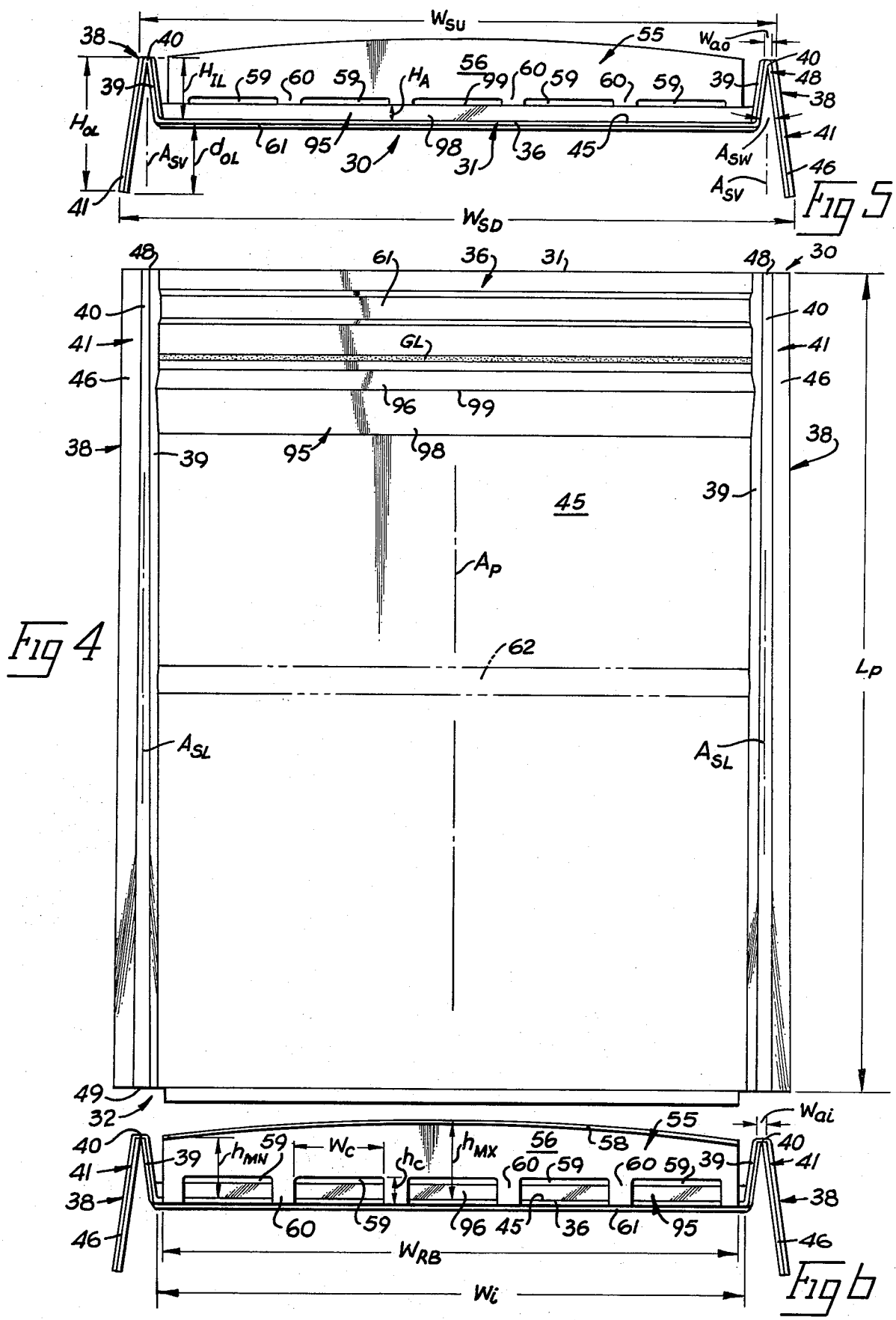

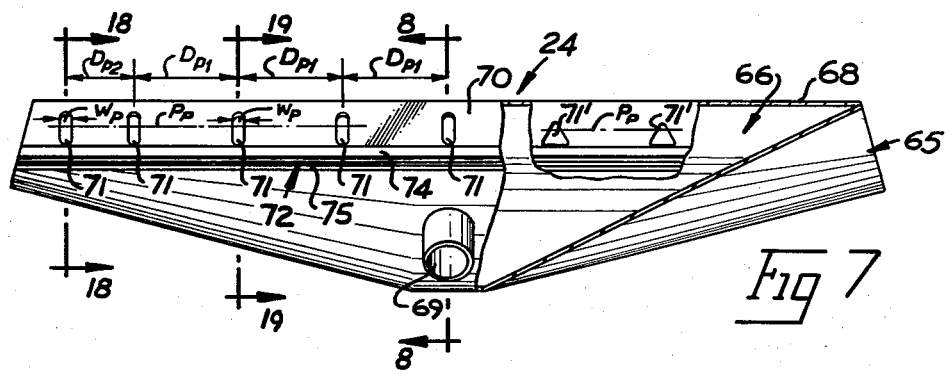
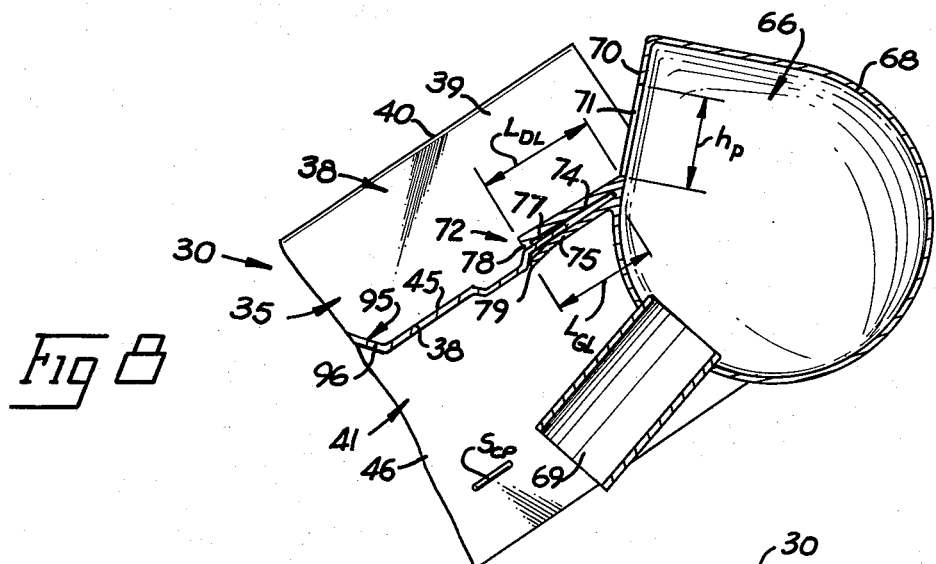
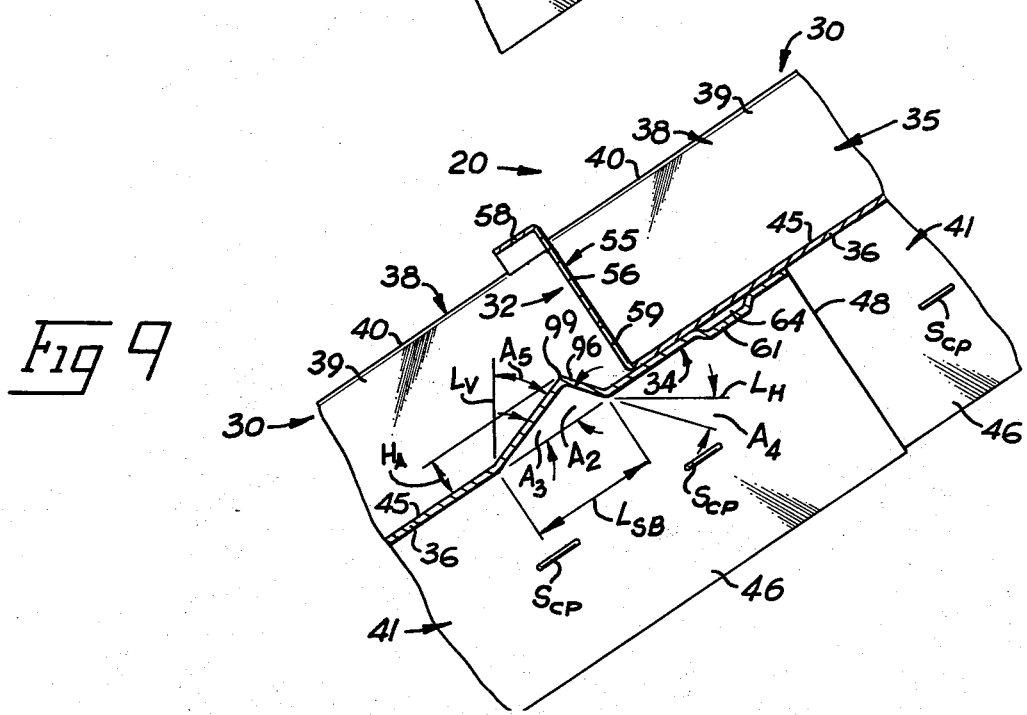

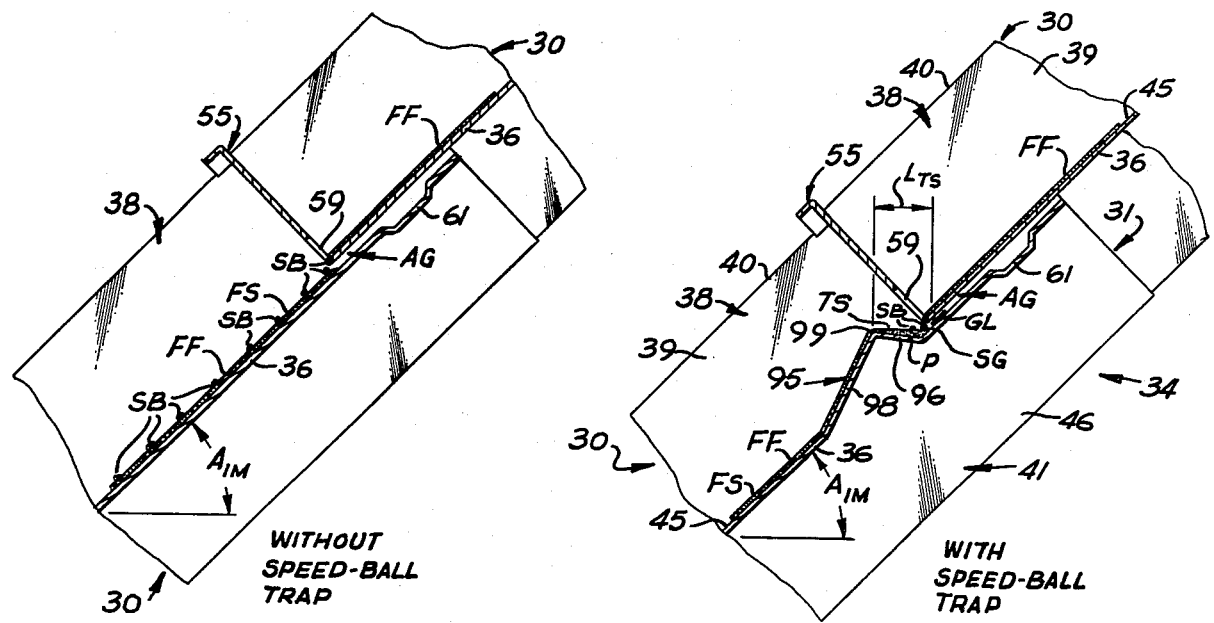
Fig 10A — WITHOUT SPEED-BALL TRAP
Fig 10B — WITH SPEED-BALL TRAP
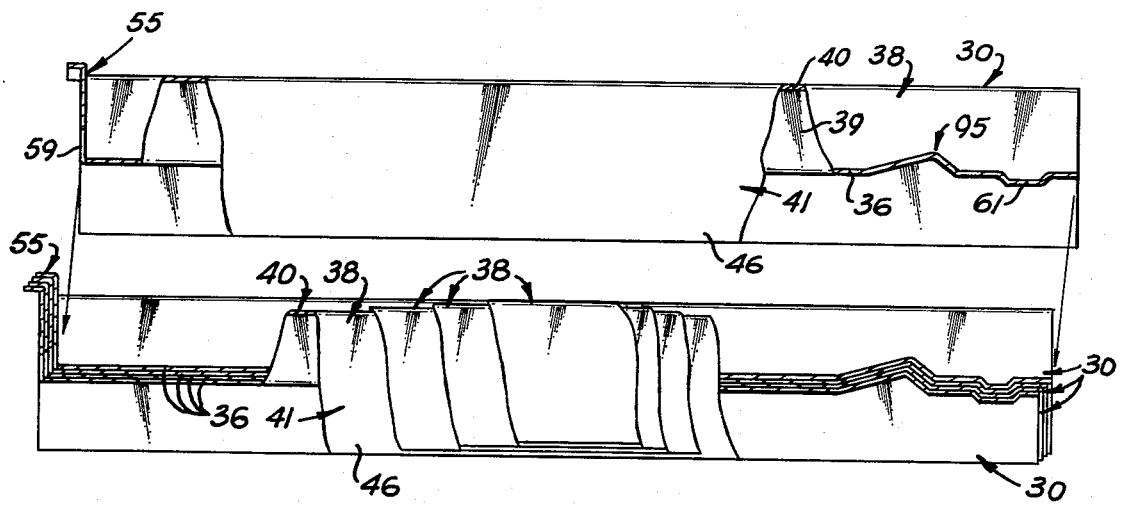
Fig 11

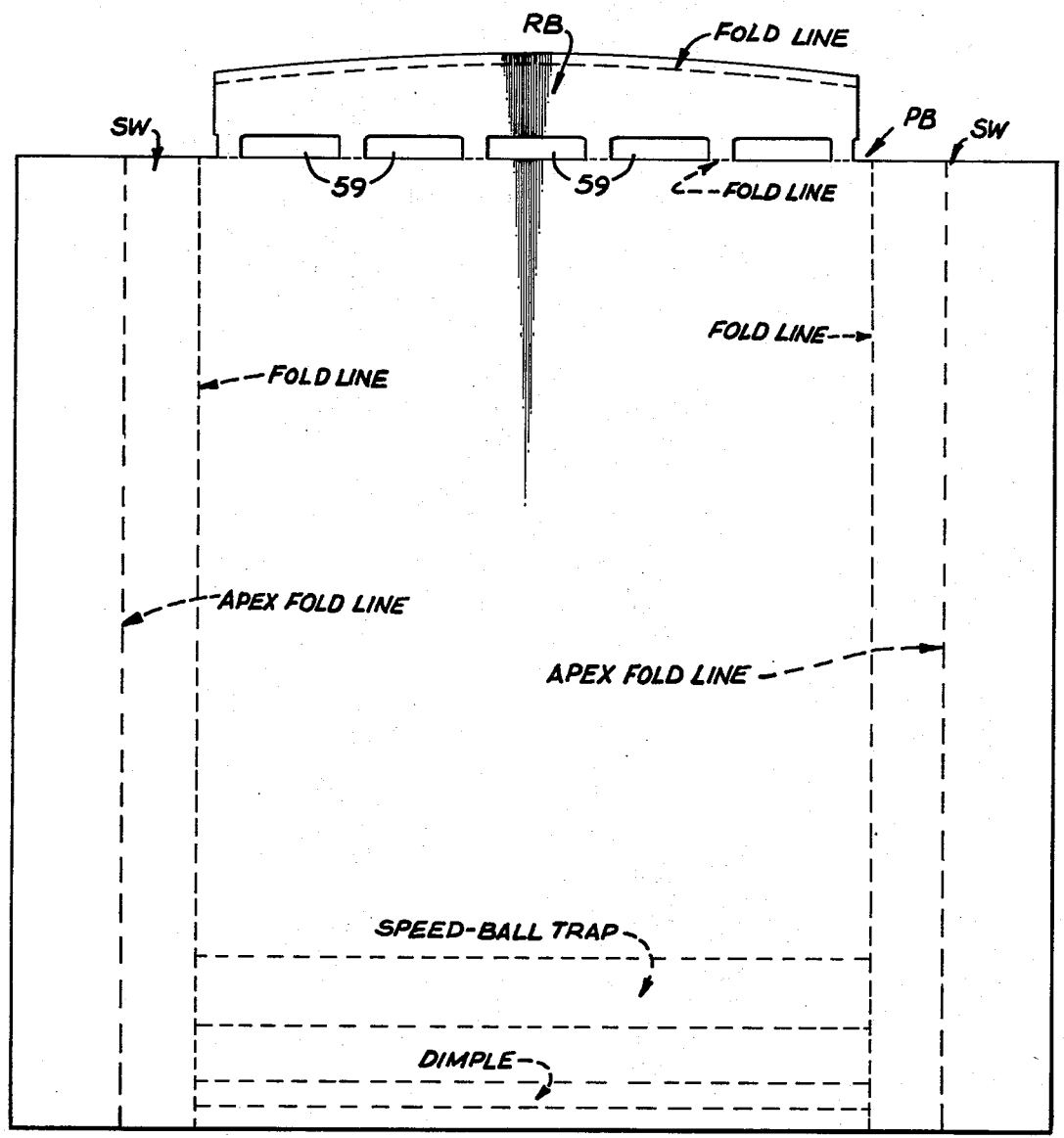

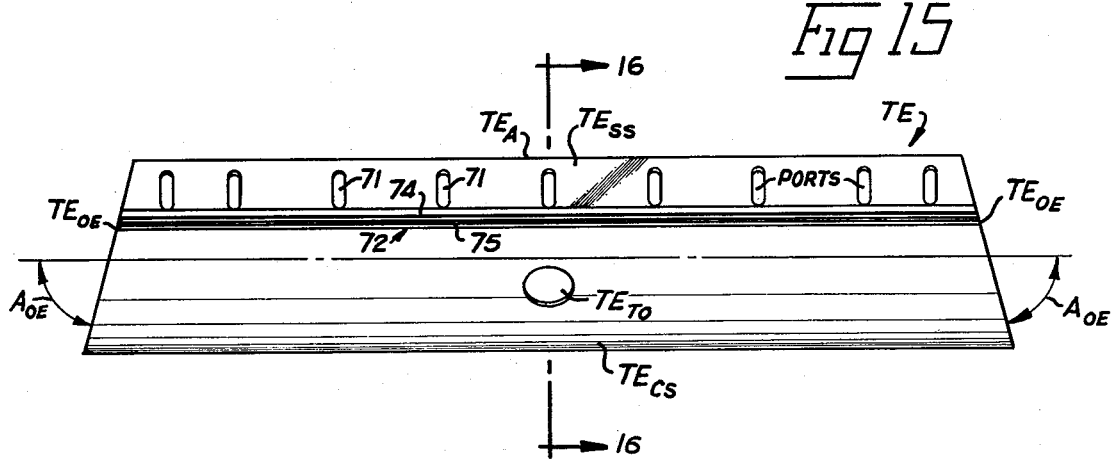
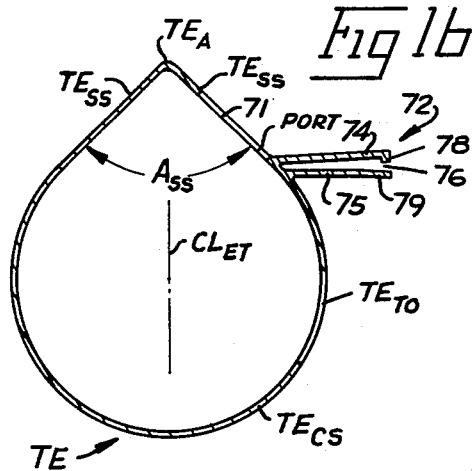
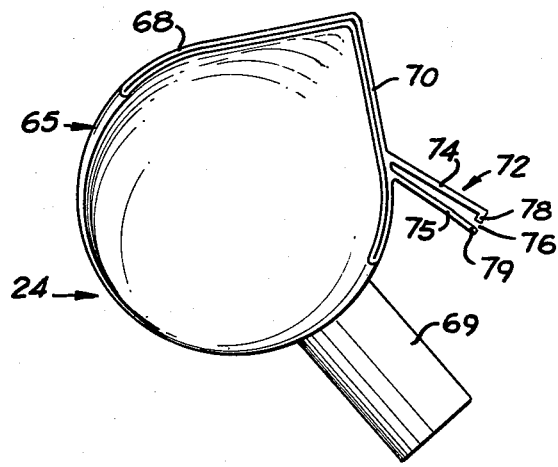
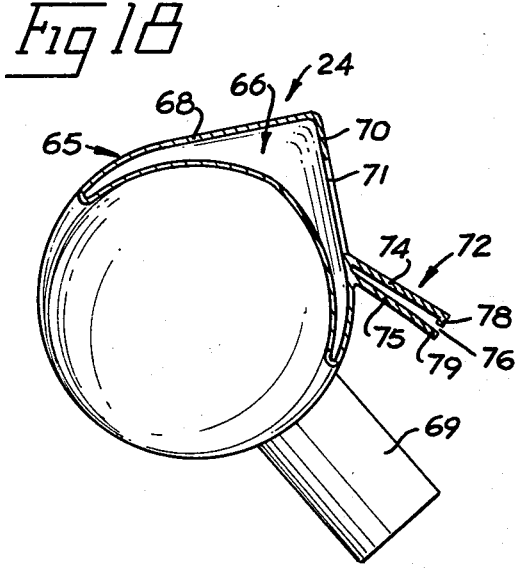
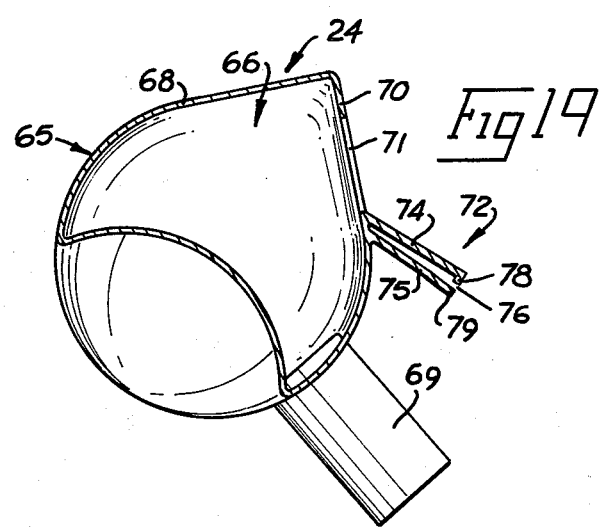

MODULAR SOLAR COLLECTOR SYSTEM

CROSS-REFERENCE TO RELATED APPLICATIONS

This application is a continuation-in-part of our earlier co-pending application Ser. No. 660,249, filed Feb. 23, 1976, now U.S. Pat. No. 4,074,705, entitled "Solar Collector Apparatus and Method".

BACKGROUND OF THE INVENTION

Flat plate solar collectors have been generally known for many years. Such flat plate solar collectors typically consist of a solar radiation absorbing member heated by solar radiation impressed thereon, a heat transfer fluid which is passed into contact with the solar radiation absorbing member to transfer the heat from the solar radiation absorbing member into the heat transfer fluid, and one or more generally transparent covers over the solar radiation absorbing member which admits incoming solar radiation while retarding thermal heat loss from the solar radiation absorbing member. Also, typically, an insulated enclosure is provided around the bottom and sides of the collector to minimize thermal heat loss. The solar radiation absorbing member is typically a metal plate painted or plated black such that about 90% of the solar radiation incident upon it will be absorbed and converted to heat therein.

One type of these prior art solar collectors employs the technique of trickling water over the solar radiation absorbing member which is tilted at an angle and generally faces the sun. This type collector was proposed in U.S. Pat. No. 1,101,001 and is commonly known as the trickle-type collector. This type collector has two serious drawbacks. The first drawback is that, when water is trickled over the solar radiation absorbing member, it may not wet the entire area of the member surface but instead runs down in streams or channels to seriously reduce the heat collection efficiency of the collector. The other problem with this type collector is that temperatures are readily reached in the solar radiation absorbing member to cause the water flowing along the member to be partially evaporated and then condensed on the cooler cover to thereby greatly increase the thermal heat loss due to the heat pipe effect and also to limit the amount of solar radiation that can reach the solar radiation absorbing member to be transferred to the water flowing over the solar radiation absorbing member. Attempts to solve some of the problems with the trickle-type collectors are shown in U.S. Pat. Nos. 3,145,707 and 3,215,134 which add an additional transparent inner flexible sheet between the collector cover and the solar radiation absorbing member and the inner sheet to prevent condensation on the inside of the collector cover. This type collector has become known as the Thomason collector. The Thomason collector, however, still suffers from the disadvantage that the water usually will not wet the entire area of the solar radiation absorbing member and continues to run down the solar radiation absorbing member in streams or channels to produce a continued reduction in collector efficiency. The use of the inner flexible sheet has also increased the original manufacturing cost of the collector.

Because of the inherent problems of the trickle-type and Thomason collectors, the closed channel type of solar collector has received more attention. The closed channel collector consists of a metal coil, usually copper, which is fastened or soldered to the solar radiation absorbing member to serve as a passageway through which water or some other heat transfer fluid may be circulated to transfer the heat from the solar radiation absorbing member to a storage tank or some other heat operated device. Alternatively, the solar radiation absorbing member has been made of two channelled metal plates bonded together so as to provide a circuitous passageway between the plates through which the heat transfer fluid can flow. While these closed channel type collectors have proved to be quite successful in operation, they are relatively costly to manufacture thereby seriously limiting their commercial use. Additionally, these collectors also require considerable amounts of supplemental power to provide the relatively high pumping pressures required to circulate the heat transfer fluid through the enclosed passageways.

Another factor which is seriously limiting the use of these prior art solar collectors is that each collector is usually made in a fixed size or must be custom made to any particular size thereby maintaining a relatively high total installed cost. Because the prior art solar collectors have been made as complete units, considerable effort must be expended to properly install them. Also, difficulties were encountered in the excess space required to ship these prior art collectors.

SUMMARY OF THE INVENTION

These and other problems and disadvantages associated with the prior art are overcome by the invention disclosed herein by providing an extremely simple solar collector system of the trickle type which uses a heat transfer fluid having a small wetting angle and a low vapor pressure differential at the temperatures to which the heat transfer fluid is exposed in the unit. The small wetting angle of the heat transfer fluid causes it to spread out over the entire surface of the heat solar radiation absorbing member in order to maximize the amount of heat transferred from the solar radiation absorbing member to the heat transfer fluid. The low vapor pressure of the heat transfer fluid prevents its evaporation and recondensation on the collector cover in order to minimize the thermal heat loss associated with this evaporation process and to maximize the amount of solar radiation impressed on the solar radiation absorbing member. Further, the solar collector is made up of a plurality of collector pans with the same construction which are serially connected by overlapping the pans so that any desued collector length may be made by overlapping the desired number of these standard collector pans during installation. The standard collector pans are sized to fit between and be easily mounted on the building rafters so that the solar collector may also be incorporated directly into the building structure with which it is to be used to minimize the manufacturing and installation costs. Trapping means it provided to prevent any droplets of fluid formed at the overlapped collector pan joints from moving rapidly down the surface of the thin film of heat transfer fluid to cause splashing.

The solar collector system comprises generally a collector pan assembly defining an inclined, open top fluid flow channel along the length thereof over which the heat transfer fluid flows under the force of gravity. The collector pan assembly includes a plurality of collector pans of like construction which fit together in an overlapped fashion so that the lower end of each collector pan overlaps the upper end of the next downstream collector pan to cumulatively form the fluid flow channel along which the heat transfer fluid flows serially over the bottom wall of each collector pan. The bottom wall of each collector pan may serve as the solar radiation absorbing member or the heat transfer fluid may absorb the solar radiation directly. Each collector pan is provided resilient mounting legs along opposed edges thereof sized so that the collector pan can be mounted between adjacent roof rafters by stapling or otherwise attaching the mounting legs to the rafters. Each collector pan is sufficiently short to be handled by a single workman to minimize the number of personnel required to install the collector. To prevent any droplets of heat transfer fluid that may be formed at the overlapped collector pan joints from rapidly moving along the length of the collector pan downstream of the pan joint as speed-balls to cause splashing, each collector pan is provided with a speed-ball trap just downstream of the pan joint that holds any droplets formed in the trap for a sufficient period of time for the fluid droplets to be absorbed in the fluid film flowing along the length of the pan without splashing. To prevent the loss of heat transfer fluid at the overlapped collector pan joints due to capillary attraction, an air gap is provided at each overlapped pan joint to prevent any capillary attraction. Also, the collector pans are made in a shape which permits compact stacking of the collector pans for shipment.

A fluid supply header is provided at the upper end of the collector pan assembly to uniformly distribute the heat transfer fluid over the width of the bottom wall of the collector pans from a plurality of ports in the header for flow down the fluid flow channel under the influence of gravity. The ports are designed to minimize flow variations across the header when the header is not exactly level and the fluid reservoir in the header has a decreasing transverse cross-sectional area along its length away from the point of introduction of the fluid into the reservoir to minimize head pressure variation across the header. A return header is provided at the lower end of the collector pan assembly which collects the heated fluid that has flowed serially down the bottom wall of the collector pans for recirculation. One or more solar radiation transmitting covers are provided over the pan assembly to allow the solar radiation to pass therethrough and heat the heat transfer fluid directly or indirectly from the collector pan bottom walls.

The heat transfer fluid is selected to have a sufficiently small wetting angle to uniformly wet the bottom walls of the collector pans and to uniformly flow along the length thereof to be heated. Further, the heat transfer fluid is selected to have an extremely low vapor pressure differential at the temperatures to which the heat transfer fluid is exposed in the collector pan assembly to prevent the loss of heat by evaporation and recondensation. It has been found that a number of different oils and silicone fluids exhibit the necessary small wetting angle and low vapor pressure differential to successfully operate the system of the invention.

These and other features and advantages of the invention disclosed herein will become more apparent upon consideration of the following specification and accompanying drawings wherein like characters of reference designate corresponding parts throughout the several views and in which:

BRIEF DESCRIPTION OF THE DRAWINGS

FIG. 2 is an exploded perspective view of the solar collector of the invention with the cover removed;

FIG. 4 is an enlarged top plan view of one of the collector pans;

FIG. 5 is an upstream end view of the collector pan of FIG. 4;

FIG. 6 is a downstream end view of the collector pan of FIG. 4;

FIG. 7 is an enlarged discharge side view of the supply header of the invention taken along line 7—7 of FIG. 1 and shown partly in cross-section;

FIG. 8 is a cross-sectional view of the upper end of the invention including the supply header taken generally along line 8—8 in FIG. 7;

FIG. 9 is an enlarged longitudinal cross-sectional view of the joint between the downstream and upstream ends of the collector pans of the invention;

FIGS. 10A and 10B illustrate the effect of the speed-ball trap;

FIG. 11 is a view illustrating the collector pans stacked for storage and shipment;

FIG. 14 is a face view of the collector pan blank;

FIG. 15 is an elevational view of the extrusion used to make the supply header;

FIG. 16 is a cross-sectional view of the extrusion taken along line 16—16 in FIG. 15;

FIG. 17 is an enlarged end view of the supply header of FIG. 7 formed from the extrusion of FIGS. 15 and 16;

FIG. 18 is an enlarged cross-sectional view taken along line 18—18 in FIG. 7;

FIG. 19 is an enlarged cross-sectional view taken along line 19—19 in FIG. 7;

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
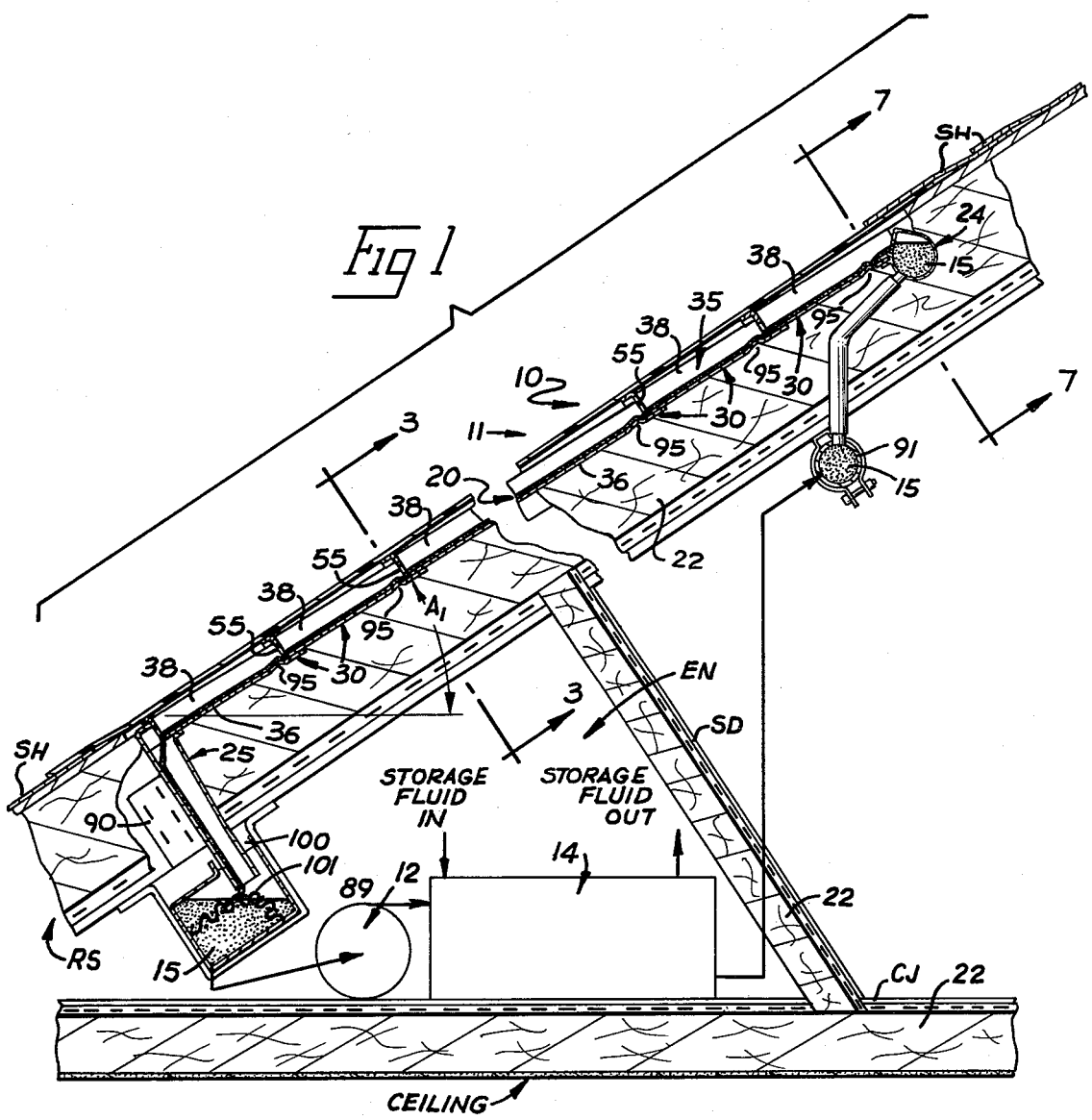
FIG. 1 is a schematic diagram illustrating one embodiment of the invention showing the solar collector in longitudinal cross-section.

As seen in FIG. 1, the solar collector system 10 includes a solar collector 11, a liquid pump 12 and a heat exchanger or heat storage device 14 with a heat transfer fluid 15 which flows from the top to the bottom of the solar collector 11 by gravity and is returned to the top of the collector by the liquid pump 12 after passage through the heat exchanger 14. The solar collector 11 is usually inclined at an angle $A_1$ so that it faces the sun to receive solar radiation therefrom and may be incorporated into the roof structure RS of a building or supported in a separate framework.

The solar collector 11 as best seen in FIGS. 1–10 includes generally a collector pan assembly 20 defining a fluid flow channel along the length thereof and typically is painted or plated black on that side facing the sun to make it highly absorbent to solar radiation, one or more glass or plastic covers 21 which close the fluid flow channel in pan assembly 20 and serve to transmit the received solar radiation into the collector pan assembly 20, a suitable insulating material 22 which prevents heat loss in the other directions facing away from the sun, a fluid supply header 24 which serves to distribute a thin fluid film FF of the heat transfer fluid 15 uniformly over the fluid flow channel in the collector pan assembly 20, and a return header 25 which collects the heated fluid 15 after it has passed along the collector pan assembly 20 to be heated and returns it to the liquid circulating pump 12. The collector 11 may include a plurality of collector pan assemblies 20 as seen in FIG. 2 connected to the heat exchanger 14.

Referring now to FIGS. 2–10, it will be seen that the collector pan assembly 20 includes a plurality of collector pans 30 of like construction which are serially connectable to form a collector pan assembly of any desired length as will become more apparent. Since the collector pans 30 are of the same construction, only one will be described in detail. Each of the collector pans 30 has an upstream end 31 (FIG. 4) and a downstream end 32 (FIG. 4) where the downstream end 32 is adapted to overlie the upstream end 31 of the next downstream collector pan 30 with a leak free joint 34 (FIG. 9). Thus, the fluid flow channel 35 (FIG. 2) is cumulative of all the overlapped collector pans 30 in pan assembly 20.

As seen in FIGS. 4–6, the collector pan 30 has a one piece construction with a central pan axis $A_p$ centered along its generally rectilinear flat bottom wall 36. Opposite side edges of the bottom wall 36 are integral with opposed inverted V-shaped side walls 38 which extend along the length $L_p$ of pan 30. Each side wall 38 has an inboard depending leg 39 and an outboard depending leg 41 joined to each other along their upper edges by an apex section 40. The legs 39 and 41 are angled toward each other with a convenient included angle $A_{SW}$, here shown as about 16°. Each side wall 38 has a longitudinal axis $A_{SL}$ (FIG. 4) generally parallel to the pan axis $A_p$ and a vertical axis $A_{SV}$ (FIGS. 5 and 6) generally normal to the upper solar absorbing surface 45 on bottom wall 36 and the longitudinal axis $A_{SL}$. The depending edge of the inboard leg 39 is integral with the bottom wall 36 to connect the side wall 38 to the bottom wall with the legs 39 and 41 centered on vertical axis $A_{SV}$. It will further be noted that the inboard leg 39 has a height $H_{IL}$ less than the height $H_{OL}$ (FIG. 5 of outboard leg 41 so that the lower depending section 46 of outboard leg 41 depends below the bottom wall 36 a distance $d_{OL}$.

Figure 3:
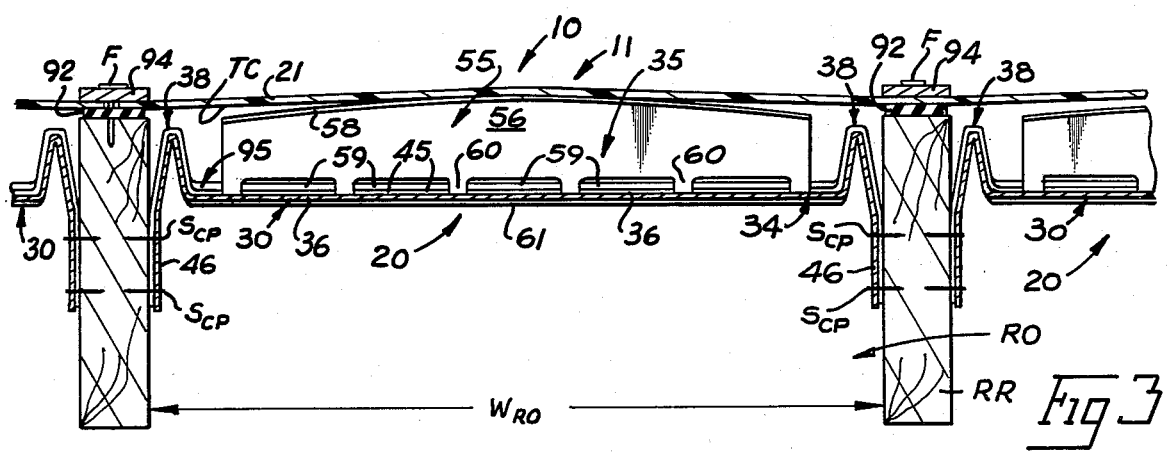
FIG. 3 is an enlarged transverse cross-sectional view of the solar collector taken along line 3—3 in FIG. 1.
Figure 12:
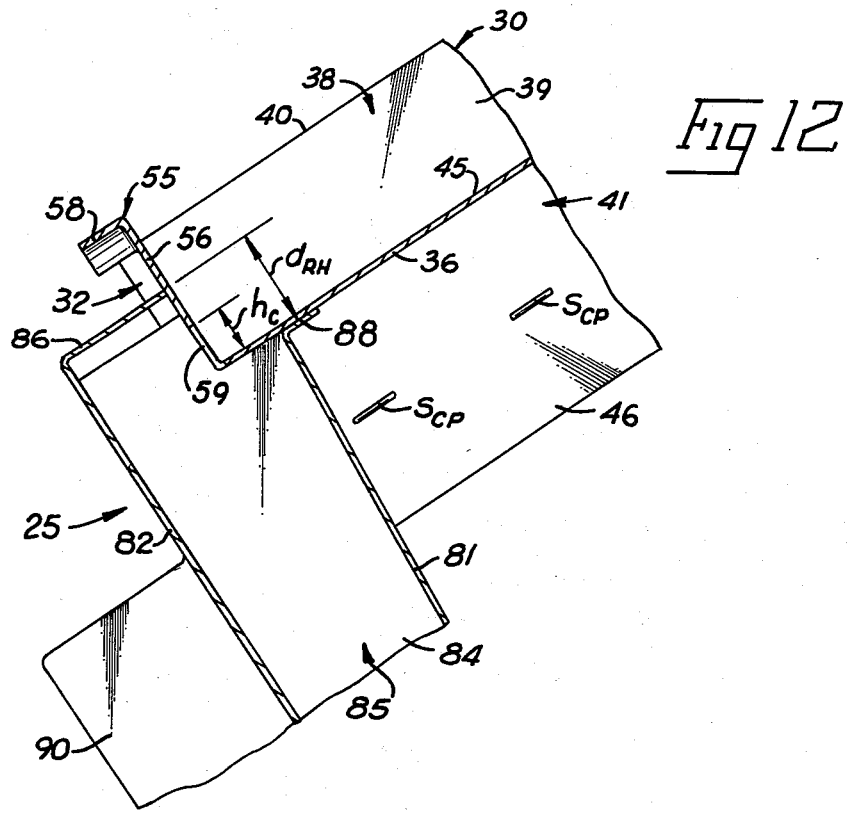
FIG. 12 is an enlarged longitudinal cross-sectional view of the lower end of the invention showing the return header.

In order for the downstream end 32 of each collector pan 30 to overlap the upstream end 31 of the next downstream collector pan 30, the inside of the downstream end 49 of each side wall 36 is sized to fit over the outside of the upstream end 48 of the side wall 38. This is provided as seen in FIGS. 4–6 by tapering the apex section 40 of each side wall outwardly from its upstream end to its downstream end so that the apex section 40 has an outside width $W_{ao}$ (FIG. 5) at its upstream end at least as small as its inside width $W_{ai}$ (FIG. 6) at its downstream end. Thus, the interior surface of the downstream end 49 of side wall 38 is complementary in shape and size to the exterior surface of the upstream end 48 of side wall 38 so that the pans 30 fit together when they overlap as seen in FIGS. 1 and 3 to prevent leakage of the heat transfer fluid 15 as it flows first over the upstream pan 30 and then over the downstream pan 30 while the outboard legs 41 are in juxtaposition to facilitate installation. The length $L_p$ of pan 30 is determined by the distance at which the bottom wall 36 of pan 30 must be supported to keep it flat and also the distance at which cover 21 must be supported. Usually, the length $L_p$ will be about 16–24 inches (40–60 m.) and the pan 30 will be overlapped a distance $d_{OL}$ (FIG. 9) about 1–6 inches (3–15 cm.).

Because the collector pans 30 are made out of thin sheet material such as thin gauge sheet metal such as 26 gauge sheet steel (0.018 inch) (0.46 mm.), it will be seen that the outboard legs 41 of side walls 38 are resilient. Further, because the upper side wall width $W_{SU}$ (FIG. 5) is less than the opening width $W_{RO}$ between the rafters RR in the roof structure RS (FIG. 3) while the lower side wall width $W_{SD}$ (FIG. 5) is about equal to or greater than opening width $W_{RO}$, the lower depending sections 46 of the outboard legs 41 will flex to a position parallel to the side surfaces as seen in FIG. 3 so that the depending sections 46 of legs 41 can be used to attach the pan 30 to the rafters RR using any convenient means such as the staples $S_{CP}$ in FIG. 3. Thus, the collector pans 30 can be leveled between the rafters even though the top edges of the rafters may not be level. This greatly simplifies the installation procedure as will become more apparent.

Usually, it is desirable to support the cover 21 over the pan 30 at spaced apart positions along the length of the collector 11 as seen in FIGS. 1 and 3. To provide this support, an upstanding rib 55 is provided at the downstream end 32 of collector pan 30 (FIGS. 3, 6, 9) and is integral with the downstream end of bottom wall 36. Rib 55 as seen in FIG. 6 has a width $W_{RB}$ which usually is less than the minimum inside width $w_i$ between the side walls 38 and is centered across the width of the bottom wall 36 of the pan 30. Rib 55 has a central web 56 which is oriented generally normal to the solar heat absorbing surface 42 of the bottom wall 36 and normal to the pan axis $A_p$. The upper edge of the web 56 may be arcuate as seen in FIGS. 3 and 6 and provided with a support lip 58, best seen in FIGS. 4 and 9, generally normal to the central web 56 to support the collector cover 21 over the fluid flow channel 35 as will become apparent. The central web 56 has a minimum height $h_{MN}$ at its opposite ends as seen in FIG. 6 about equal to the height of the side walls 38 and a maximum height $h_{MX}$ at its center which is usually slightly higher than the side walls 38 to slightly curve the collector cover 21 (FIG. 3) if it is flexible as will become more apparent.

The lower edge of the central web 56 is provided with a plurality of cutouts 59 therethrough best seen in FIG. 6 to form attachment sections 60 therebetween which are integral with the downstream end of bottom wall 36. The cutouts 59 have a prescribed width $w_C$ and prescribed height $h_C$ to allow the heat transfer fluid to pass under the ribs 55 around the attachment sections 60. It will be noted that the width and number of cutouts 59 are such that the heat transfer fluid can flow along over the solar heat absorbing surface 45 on the bottom wall 36 of the pan 30 and through cutouts 59 over the major portion of the width of the solar radiation absorbing surface 45. The height $h_C$ of the cutouts 59 is selected to be greater than the maximum film thickness that will be encountered in the heat transfer fluid as it flows along the surface 45 of the bottom wall 36 as will become more apparent. The ribs 55 serve primarily to keep the solar heat absorbing surface 45 on the bottom wall 36 substantially flat at the downstream end thereof and to support the cover 21. The ribs 55 also serve to reduce convective currents in the air in the fluid channel 35 (FIG. 1) between the cover 21 and the film of heat transfer fluid 15 flowing down the surface 45.

Where the bottom walls 36 overlap, capillary attraction will usually tend to force the heat transfer fluid flowing over the bottom wall joint back up between the bottom walls and cause leakage. To break up this capillary attraction, an air gap 64 is formed between the bottom walls 36 just upstream of the downstream end of the upper overlapped bottom wall 36 as seen in FIG. 9. While the air gap 64 may be formed in different ways, it is illustrated formed by a transversely extending dimple 61 in the bottom wall 36 adjacent the upstream end thereof. Thus, when the bottom walls 36 are overlapped, the dimple 61 forms an air gap 64 between the bottom surface of the bottom wall 36 of upstream collector pan 30 and the top solar absorbing surface 45 of the bottom wall 36 of the downstream collector pan 30.

It has been found that when the collector pan assembly 20 is assembled using the collector pans 30, the bottom wall 36 of each of the collector pans 30 at its downstream end 32 may not contact the top surface 45 of the bottom wall 36 of the next downstream collector pan 30 at its upstream end 31. This is generally due to installation error. When this occurs as illustrated in FIGS. 10A and 10B, a small air gap AG will be present between the non-contacting portions of the overlapped bottom walls 36. As the heat transfer fluid flows over this air gap AG in falling from the downstream end of each pan 30 onto the upstream end of the next downstream pan 30, the fluid may form droplets SB. If the air gap is of sufficient height for the heat transfer fluid to form these droplets SB, these droplets will not be immediately absorbed in the fluid film on the bottom wall 36 of the downstream pan, but, rather, will very rapidly move down the surface of the fluid film FF on the downstream pan 30. This is illustrated in FIG. 10A. While the droplets SB appear to be gradually absorbed into the fluid film FF, the speed at which these droplets move down the surface FS of the fluid film will usually cause the droplet to pass the next downstream rib 55 on the pan 30 prior to absorption. Unless the droplet SB happends to pass through one of the cutouts 59 and continue to move down the surface of the film FF, it will strike one of the attachment sections 60 on the rib 55 and cause splashing or splattering of the fluid onto the rib 55 and frequently the cover 21. This causes two problems. The first problem is that because the fluid film FF flowing down the bottom walls 36 of the collector pans 30 is so thin, a significant loss of heat transfer fluid results when the splashing fluid wets the rib 55 and/or the cover 21. The second problem is that when the heat transfer fluid is splashed onto the underside of the cover 21, it significantly reduces the solar radiation transmission through the cover 21. Therefore, it is highly desirable to prevent the droplets SB from moving down the surface of the fluid film FF on the bottom wall 36 after formation and also to prevent their acceleration sufficiently to cause splashing. For convenience, the droplets of fluid which move along the surface of the fluid film have been identified as speed-balls SB.

To reduce the affect of the speed-balls, a speed-ball trap 95 seen in FIGS. 9 and 10B is formed in the bottom wall 36 of each collector pan 30 adjacent the upstream end 31 of the collector pan 30. The speed-ball trap 95 serves to provide a trapping subsurface TS on the fluid film FF flowing down the bottom wall 36 which is generally horizontal 20 that the speed-balls SB will be retained on this trapping surface TS long enough for the speed-balls SB to be absorbed. Further, the speed-ball trap 95 provides a surface over which the fluid film flows as it moves over the downstream side of the speed-ball trap 95 to insure that the fluid film FF will flow along this downstream surface without free falling sufficiently to form additional speed-balls.

While the speed-ball trap 95 may have a number of different configurations, the speed-ball trap 95 illustrated is an inverted V-shaped section formed in the bottom wall 36 of each collector pan 30. The speed-ball trap 95 has an upstream leg 96 and a downstream leg 98 where the legs 96 and 98 are joined at an apex 99. The apex 99 is spaced above and parallel to the upper surface 45 on the bottom wall 36. It will thus be seen that the upstream leg 96 defines an included angle $A_2$ with the plane of the bottom wall 36 while the downstream leg 98 defines an included angle $A_3$ with respect to the plane of the bottom wall 36. The upstream leg 96 will also define an included angle $A_4$ with respect to the horizontal line $L_H$ while the downstream leg 98 will define an included angle $A_5$ with respect to the vertical line $L_V$. The apex 99 is located a distance $H_A$ above the upper surface 45 of the bottom wall 36 and the speed-ball trap 95 has an overall length $L_{SB}$. It will be noted that if the included angle $A_2$ is greater than the tilt angle $A_1$ of the collector, then the upstream leg 96 will form a pool P of heat transfer fluid 15 thereabove which is thicker than the fluid film FF that flows down the bottom wall 36.

When the collector pans 30 are assembled into the collector pan assembly 20 so that the pans overlap as shown in FIGS. 9 and 10B, there are certain limiting criteria for the speed-ball trap 95. The most critical criteria is that the speed-balls SB must be retained on the trapping subsurface TS of the fluid film FF or the pool P of heat transfer fluid on the upstream side of the speed-ball trap 95 for a sufficient period of time for the speed-balls to be absorbed in the fluid film FF or the pool P. Because the frictional drag at the interface between the speed-balls SB and the trapping subsurface TS of the fluid film FF or pool P is extremely low, the trapping subsurface TS should be at the maximum obtainable upward slope. Because the maximum obtainable upward slope is horizontal, then, the surface TS should be horizontal as seen in FIG. 10B. In practice, the upstream leg 96 of the speed-ball trap 95 is formed so that it is at least horizontal at the maximum tilt angle $A_{1M}$ (FIGS. 10A and 10B) of the collector pan assembly 20 when in use. To insure that the trapping subsurface TS is horizontal, the leg 96 will usually be angled upwardly slightly with respect to the horizontal at some small angle when the pan assembly is at its maximum tilt angle. As an example, the collector pans 30 illustrated are designed for use at a maximum tilt angle $A_{1M}$ of about 45° (FIG. 10B) and the leg 96 would angle upwardly from the horizontal at the 45° tilt angle at about 5°–10°. This produces an included angle $A_2$ between the upstream leg 96 and the plane of bottom wall 36 of about 50°–60°. This insures that the trapping subsurface TS will always be horizontal.

To maximize the time that the speed-balls SB are retained on the trapping subsurface TS, that component of the velocity of the speed-balls SB along the trapping subsurface TS (i.e. the horizontal velocity component) should be minimized. This can be accomplished by positioning the downstream end 32 of the upstream collector pan 30 so that any speed-balls SB dropping from the upstream pan 30 onto the downstream pan 30 will fall vertically substantially onto the trapping subsurface TS as illustrated in FIG. 10B. Thus, the downstream end 32 of the upstream pan 30 would be at least about even with the inboard edge of the trapping subsurface TS as its juncture SG with the general film surface FS on the upstream side of the speed-ball trap 95. When the downstream end 32 of the upstream pan 30 is about even with the film surface juncture SG, the formation of the speed-balls SB will be vertically aligned over the trapping subsurface TS as seen in FIG. 10B.

The length $L_{TS}$ of the trapping subsurface TS also contributes to the length of time the speed-balls SB remain thereon. The length $L_{TS}$ should be sufficiently short so as not to interfere with the solar heating of the heat transfer fluid. The length $L_{TS}$ should also be sufficiently long to prevent the speed-balls SB from falling past the trap 95 without contacting the upstream side thereof. While considerable variation in the length $L_{TS}$ is permissible, a range of about ¼-1 inch (6–25 mm) has performed satisfactorily. The length $L_{TS}$ of the trapping subsurface TS is a function of the height $H_4$ of the speed-ball trap 95 (FIGS. 9 and 10B) and the tilt angle $A_1$ of the collector pan assembly 20. Because the length $L_{TS}$ increases as tilt angle $A_1$ decreases for any particular height $H_4$, the height $H_4$ of the speed-ball trap 95 is selected so that the minimum desired length $L_{TS}$ in the trapping subsurface TS is produced at the maximum tilt angle $A_{1M}$ seen in FIG. 10B. Then, when the collector pan assembly 20 is installed at smaller tilt angles $A_1$ such as illustrated in FIG. 9, a sufficient length $L_{TS}$ is insured. While this height $H_4$ may be varied, the particular height $H_4$ illustrated is about 0.35 inch (9 mm) which produces a length $L_{TS}$ of about 0.6 inch (15 mm) in subsurface TS at the maximum tilt angle $A_{1M}$ illustrated as about 45° in FIG. 10B.

Another of these limiting criteria is that the heat transfer fluid 15 must flow over the apex 99 and down the downstream side of the speed-ball trap 95 without free falling to form additional speed-balls SB. Because the critical angle of the downstream leg 98 of the speed-ball trap 95 occurs at the maximum tilt angle $A_{1M}$ (FIG. 10B), the leg 98 should be no more than vertical at this maximum tilt angle. As the tilt angle $A_1$ decreases, the leg 98 will angle further away from the vertical toward the bottom wall 36 at increasing angles $A_5$ (FIG. 9). Where the maximum tilt angle $A_{1M}$ is about 45° as illustrated in FIG. 10B, the angle $A_3$ between the leg 98 and the plane of bottom wall 36 should be no more than about 45°. The particular angle $A_3$ illustrated is about 30°.

In summary, the angle $A_2$ between the upstream leg 96 and the plane of the bottom wall 36 should be at least equal to the maximum tilt angle $A_1$ to be used with the system. On the other hand, the angle $A_3$ between the leg 98 and the plane of the bottom wall 36 should be no more than the maximum tilt angle $A_1$ to be used.

The speed ball trap 95 may be used to prevent the formation of the speed-balls SB, especially if a pool P of heat transfer fluid is formed by the trap 95 as seen in FIG. 10B. If the downstream end 32 of the upstream pan 30 is positioned so that it contacts the pool P as shown by phantom lines in FIG. 10B, no speed-balls SB will be formed even though there is an air gap AG between the upstream bottom wall 36 and the downstream bottom wall 36.

Alternative speed-ball trap constructions may be used. Such alternative constructions should be such that any speed-balls formed will be retained on the surface of the fluid film for a sufficient period of time for adsorption of the speed-balls before they strike an obstacle in the fluid flow channel through the collector pans so as to prevent splashing. Also, such alternative speed-ball traps should not create additional speed-balls.

To assist the workman in aligning the downstream end 32 of each collector pan 30 with the film surface juncture SG on the upstream end of the next downstream pan 30, a guide line may be scribed, painted or otherwise formed on each pan 30. A painted guide line GL is illustrated in FIG. 4 which would be covered by the downstream end 32 of the next upstream pan 30 as illustrated in FIG. 10B.

It will thus be seen that each of the collector pans 30 have a unitary construction. This greatly facilitates the formation thereof. As illustrated in FIG. 14, each collector pan 30 is made by stamping or punching a flat pan blank PB from a sheet of material. The cutouts 59 are punched in this operation. The flat blank PB thus has a rib section RB, a bottom wall section BW and a pair of side wall sections SW. In subsequent forming operations, the rib section RB is folded up to form rib 55 and the support lip 58 formed. The side wall sections SW are folded into the inverted V-shaped side walls 38. The dimple 61 and the speed-ball trap 95 are also formed in the bottom wall section BW.

Because the collector pans 30 all have the same construction, they can be compactly stacked for shipment. This is illustrated in FIG. 11 where the ribs 55 are in juxtaposition with the support lips 58 overlapping. The speed-ball traps 95 fit within each other and so do the dimples 62 so that the collector pans 30 evenly stack.

It will be noted that the bottom wall 36 of each collector pan 30 is held flat at its lower end by the rib 55 and at its upper end by the dimple 61 and speed-ball trap 95. Additional reinforcing dimples such as the dimple 62 shown by phantom lines in FIG. 4 may be formed intermittent of the length of bottom wall 36 to further insure that the bottom wall 36 will be flat.

The supply header 24 best seen in FIGS. 7 and 8 includes generally a seamless tubular housing 65 defining a heat transfer fluid reservoir 66 therein which receives the heat transfer fluid 15 under the pressure of pump 12 and evenly distributes the heat transfer fluid over the fluid flow channel 35 in the collector pan assembly 20. The housing 65 includes generally a seamless tubular side wall 68 which is folded back into itself at opposite ends thereof to define the reservoir 66 as will become more apparent. The lower portion of the housing 65 is provided with a fluid inlet tube 69 through which the heat transfer fluid is supplied to the reservoir 66. The upper portion of the side wall 68 is formed into a flat angular discharge section 70 (FIG. 8) which defines a plurality of discharge ports 71 therethrough for discharging the heat transfer fluid 15 from reservoir 66. The outlet ports 71 are arranged along a common path $P_p$ extending across the width of the header 24 with the path $P_p$ being generally parallel to the solar radiation absorbing surface 45 on the bottom wall 36 of the pan 30. The ports 70 are spaced across the width of the header 24 with a prescribed distance $D_{p1}$ or $D_{p2}$ therebetween. Each of the ports 71 are a prescribed width $w_p$ and a prescribed height $h_p$ which will determine the total volume flow rate possible from the reservoir 66. Thus, the width $w_p$ and the height $h_p$ are selected so that the total discharge opening area of the ports 71 is at least great enough to provide the maximum volume flow rate for the heat transfer fluid that may be required in the operation of the collector system. The use of elongate ports 71 in the header 24 tends to reduce the need for precise leveling of the inlet header 24 to assure substantially uniform flow across the width of the solar radiation absorbing surface 45. This is because a change in the level of the heat transfer fluid in the reservoir 66 across the width of the header 24 generates less of an increase in flow difference between one side of the header 24 and the other side of the header than would be encountered if a single opening extending all the way across the width of the header 24 was used.

Alternatively the discharge ports from the supply header 24 may have a generally triangular shape as shown by port 71' in FIG. 7 rather than that shown for ports 71. The ports 71' would be arranged similarly to ports 71. Port 71' tapers inwardly from its bottom to its top with a maximum height along its vertical axis and a maximum width at its lower end. The width and height of ports 71' would also be selected so that the total discharge opening area of the ports 71' is at least great enough to provide the maximum flow rate for the heat transfer fluid that may be required in the operation of the collector system. The use of the tapered ports 71' minimize the variations in fluid flow rate through the ports across the width of the collector pan when the header 24 is not exactly level.

Actually, the system of the invention can tolerate a considerable degree of nonuniformity in flow thereacross. The important consideration is that the minimum flow rate be great enough to cool the solar absorbing surface 45 in channel 35 with an acceptable temperature gradient while the maximum flow rate be small enough to prevent splashing waves in the flow down the surface 45.

It will be noted that the fluid inlet tube 69 is centered along the length of the supply header 24 although its location may be changed. It will further be noted that the transverse cross-sectional area of the reservoir 66 decreases from the inlet tube 69 outwardly along the width of the header 24 toward the ends thereof. This tends to insure uniform flow from the ports 71 or 71' across the length of the header 24 since the fluid flow through the transverse cross-section of the reservoir 66 decreases as one moves further away from the inlet tube 69. For instance, at that transverse cross-section of reservoir 66 located in alignment with the first port 71 outboard of the inlet tube 69, a sufficient quantity of heat transfer fluid must pass therethrough to supply the first port 71 as well as the other three ports 71 outboard thereof. At the cross-section in alignment with the second port 71 outboard of the inlet tube 69 only a sufficient quantity of heat transfer fluid must pass therethrough to supply the second port 71 and the other two ports 71 outboard thereof. Thus, it will be seen that enough heat transfer fluid to supply four ports must pass through the cross-section at the first outboard port 71, enough for three ports at the second port 71, enough for two ports at the third port 71, and enough for one port at the last port 71. It is desirable to minimize the amount of heat transfer fluid required to fill the reservoir 66 in header 24 to a working level while at the same time minimizing the fluid head pressure variation at the ports 71 across the width of the header 24. These desirable features are accomplished by the decreasing transverse cross-sectional area of the reservoir 66 from the inlet tube 69 outwardly along the width of header 24.

The supply header 24 is provided with a connector 72 across the width thereof as seen in FIGS. 7 and 8 to connect the header 24 with the upstream end 31 of one of the collector pans 30. The connector 72 includes a discharge leadge 74 which fits over the upstream end of the bottom wall 36 of collector pan 30 and a grip ledge 75 which fits under the upstream end of the bottom wall 36. The discharge ledge 74 is located over the grip ledge 75 to define a space 76 therebetween which slidably receives the bottom wall 36. The discharge ledge 74 has a length $L_{DL}$ so that it will project out over the bottom wall 36 of pan 30 and the grip ledge 75 has a similar length $L_{GL}$. The ledges 74 and 75 are integral with the side wall 68 of housing 65 at their inner ends. The projecting end of discharge ledge 74 is provided with a contact lip 78 (FIG. 8) which extends inwardly toward the grip ledge 75 to contact the solar absorbing surface 45 on bottom wall 36. The contact lip 78 serves to form an air gap 77 between the ledge 74 and the top solar absorbing surface 45 on the pan bottom wall 36. The air gap 77 serves to interrupt any capillary action tending to force the heat transfer fluid 15 back under the ledge 74. A guide flange 79 (FIG. 8) may be provided on the projecting of grip ledge 75 to assist in inserting the collector pan bottom wall 36 into the space 76. The space 76 is sized so that when the bottom wall 36 is forced into space 76, the grip ledge 75 will force the solar absorbing surface 45 on collector pan 30 into contact with the contact lip 78 on discharge ledge 74 (FIG. 8) to positively lock the header 24 onto collector pan 30 and form the air gap 77 to prevent the heat transfer fluid 15 from flowing back under ledge 74.

The return header 25 as best seen in FIGS. 1, 2 and 10 receives the heat transfer fluid after it has flowed down channel 35 under the influence of gravity and has been heated by the bottom walls 36 of collector pans 30. Header 25 includes spaced apart front and back walls 81 and 82 joined along opposite edges by end walls 84 to define a collection passage 85 therethrough with a generally rectilinear cross-section open at its upper and lower ends. The front wall 81 terminates a prescribed distance $d_{RH}$ below the upper edge of back wall 82 which is greater than the height $h_c$ of the cutouts 59 in rib 55 on pan 30. The upper edge of the back wall 82 is provided with an outwardly extending spacer lip 86 normal to wall 82 and the upper edge of front wall 81 is provided with a support lip 88 normal to wall 81. The header 25 is oriented so that the walls 81 and 82 are generally normal to the bottom wall 36 of collector pan 30 and the downstream end 32 of the downstreammost collector pan 30 in pan assembly 20 projects into the passage 85 over lip 88. Mounting brackets 90 are provided on opposite sides of header 25 to mount same.

The rib 55 abuts the spacer lip 86 to insure that the downstream end 32 of pan 30 does not butt against the back wall 82 of header 25 to restrict the flow of the heat transfer fluid 15 through cutouts 59 in rib 55 and into the passage 85 through header 25. The heated heat transfer fluid 15 then flows through header 25 into a receiver 89 seen in FIG. 1 so that the heated fluid 15 can be pumped by pump 12 through heat exchanger 14 back to the supply header 24 through a distributing manifold 91. The receiver 89 illustrated is an elongate tubular member which is attached to the underside of the rafters RR at the lower end of the collector 11 and extends generally horizontally while at the same time generally normal to the pan axes $A_p$. A receiver opening 100 is provided along the length of the top of the receiver 89 through which the downstream end of the return header 25 is freely received. A dispersion member 101 may be provided in the receiver 89 so that the collected heat transfer fluid 15 flowing out of the downstream end of the return header 25 will not fall directly onto the surface of the heat transfer fluid already in the receiver 89 and cause splashing. While different diffusion members 101 may be used, the member illustrated is a piece of relatively fine mesh wire screen.

The cover 21 (FIGS. 1 and 3) is a relatively thin sheet of material which will transmit almost all of the solar radiant energy incident thereon through the cover 21 into the fluid flow channel 35 in collector pan assembly 20 so that the transmitted solar radiation is impressed on the solar radiation absorbing surfaces 45 of the collector pans 30. While a number of different materials have this capability, a fiber glass reinforced polyester plastic sheet has been found quite satisfactory. Such sheet material is commercially available from Kalwall Corporation of Manchester, New Hampshire, and transmits about 90% of the solar energy incident on it therethrough. The cover 21 is sufficiently long to cover the fluid flow channel 35 in collector pan assembly 20 and is wider than channel 35. Where multiple collector pan assemblies 20 are used in parallel (FIGS. 2 and 3), the cover 21 may be made sufficiently wide to span more than one collector pan assembly 20 as seen in FIG. 3. The cover 21 is placed over the supply header 24, collector pan assembly 20 and return header 25 so that it is supported by the lips 58 on ribs 55 as seen in FIGS. 1 and 3. The opposite side edges of cover 21 are sealed with sealing gaskets 92 and held in place by clamping strips 94 with conventional fasteners as seen in FIG. 3.

It is to be understood that more than one cover 21 may be used to cover the collector pans 20 with the covers overlying each other. When more than one cover 21 is used, an air space is usually left between overlying covers to reduce the thermal and radiant heat loss from the fluid flow channel 35. The use of these overlying covers allows the maximum available output temperature in the heat transfer fluid 15 to be raised without excessive heat loss. The cover 21 may also be coated with thermal coating TC as seen in FIG. 3, which transmits the solar radiation therethrough but reflects thermal re-radiation from the absorbing surfaces 45 in pans 30 and/or the heat transfer fluid 15 back into the fluid 15 back into the fluid flow channel 35 to reduce heat loss.

SUPPLY HEADER FABRICATION

The supply header 24 is basically a one-piece construction. As seen in FIGS. 14 and 15, the header is made from a tubular extrusion TE having a constant cross-sectional shape along its length corresponding to the center of the finished header 24 seen in FIG. 8. It will be noted from FIG. 15 that this cross-section has a tear-drop shape with a circular section $TE_{CS}$ which is integral at its opposite ends with intersecting straight sections $TE_{SS}$. The straight sections $TE_{SS}$ define an included angle $A_{SS}$ therebetween (shown as 90°) and are integral at their point of intersection to form an apex $TE_A$. The discharge ledge 74 and the grip ledge 75 forming connector 72 are extruded on the extrusion TE. The extrusion TE is then cut to length with opposite ends $TE_{OE}$ angled outwardly from the apex $TE_A$ to the lower portion of the circular section $TE_{CS}$ (FIG. 14) so that the ends $TE_{OE}$ define included angles $A_{OE}$ (shown as 75°) with respect to the longitudinal centerline $CL_{EL}$ of the extrusion TE. The extrusion TE also has a transverse centerline $CL_{ET}$ extending through apex $TE_A$ (FIG. 15). The ledges 74 and 75 are generally normal to centerline $CL_{ET}$ and parallel to centerline $CL_{EL}$.

The ports 71 are then punched or otherwise formed through the straight section $TE_{SS}$ adjacent connector 72. Also an inlet tube opening $TE_{TO}$ is punched or otherwise formed in the center of extrusion TE under connector 72 in the circular section $TE_{CS}$. Because the cross-sectional shape of extrusion TE is substantially constant, the formation of the ports 71 and the tube opening $TE_{TO}$ can be accomplished quickly and inexpensively on automated equipment.

The opposite ends of the extrusion TE are folded back toward the apex $TE_A$ to close the ends of the extrusion TE and form the reservoir 66 therein. The extrusion TE now has become housing 65 as seen in FIGS. 7, 8 and 16–18. The angles $A_{SS}$ are such that when that point of the circular section $TE_{CS}$ diametrically opposite the apex $TE_A$ is folded back into apex $TE_A$, the ends align as seen in FIGS. 7 and 16. The aligned and juxtaposed ends are then appropriately sealed as by welding or soldering. The folded portion of the circular section $TE_{CS}$ slopes downwardly toward the center of the header 24 as will be seen from reference to FIGS. 17 and 18 to form the varying cross-section in reservoir 66 so that head loss from the center to the ends of header 24 is minimized while at the same time the amount of heat transfer fluid required to fill the reservoir 66 in the header 24 is also kept low.

The inlet tube 69 is installed either before or after the folding operation and is appropriately sealed to the sidewall 68 about opening $TE_{TO}$ such as by soldering. The header 24 is now complete.

INSTALLATION

As best seen in FIGS. 1–3, the solar collector 11 may be installed in the roof structure RS of the building on which it is to be used provided the roof angle and orientation are adequate to orient the collector. Normally a section of the roof structure is selected which generally faces south in the Northern Hemisphere and north in the Southern Hemisphere and is inclined so that the tilt angle $A_1$ of the collector is about equal to the latitude of the location of the building. Each collector 11 is generally mounted between the roof rafters RR best seen in FIGS. 2 and 3. Since the center-to-center spacing and the size of the rafters RR are generally standarized, the width of the collector 11 can likewise be standardized. On the other hand, because of the lack of accuracy in present day construction techniques and in the rafter sizes, the opening RO into which the collector 11 is to fit may vary. Also, the top edges of the rafters RR may be not true. The resiliency of the outboard legs 41 on the side walls 38 of collector pans 30 compensate for the variations in the rafter opening width $W_{RO}$. Because the collector pans 30 are not supported by the top edges of rafters RR but by the inside edges thereof, variations in the top edges of the rafters is inconsequential.

Because the collector pans 30 are relatively short, the pans can be handled by a single workman. Also, because the pans 30 are made out of a relatively thin sheet material, the fasteners such as staples $S_{CP}$ can be driven directly through the depending sections 46 of the outboard legs 41 of the pans 30 without having to preform holes therethrough. This permits the workman to use driving equipment such as a staple gun to quickly attach each collector pan 30 to the rafters RR.

Usually, the workman assembles the collector 11 by scribing a convenient layout line (not shown) down the opposed inside edges of rafters RR. The upstreammost collector pan 30 is then usually positioned on the lines and stapled into position. The workman then positions the next downstream collector pan 30 so that upstream end 31 underlies the downstream end 32 of the already installed pan 30 and the downstream end 32 of the already installed pan 30 covers the guide line GL of the downstream pan 30. This causes the downstream end 49 of the already installed pan 30 to overlap the upstream end 48 of the side wall 38 of the pan 30 being installed. When the next downstream pan 30 is aligned with the scribe lines, it is stapled in position. This process is repeated until the desired length pan assembly 20 is formed.

The workman then forces the connector 72 on supply header 24 over the upstream end of the bottom wall 36 of the upstreammost collector pan 30 as illustrated in FIG. 8. The header 24 is now carried by the collector pan 30. Appropriate brackets (not shown) may be used to hold the header 24 in position although these are generally unnecessary.

The workman also positions the return header 25 at the downstreammost collector pan 30 as seen in FIGS. 1 and 10, and staples it in position. The positioning of receiver 89 and distributing manifold 91 allows the collector pan assembly 20 to be connected to pump 12 and heat exchanger 14 as seen in FIG. 1.

The sealing gaskets 92 are placed on the top edges of rafters RR (FIG. 3) and the cover 21 is placed over the pan assembly 20 so that it is supported by gaskets 92 and support lips 58 on the collector pan ribs 55. The clamping strips 94 are fastened to the rafters RR over the cover 21 to hold them in place with the cover 21. The strips 94 are held in place by fasteners F (FIG. 3). The upper end of the cover 21 extends over the roof shingles SH above the collector 11 and over the roof shingles SH below collector 11 as seen in FIG. 1 to provide a watertight roof.

Insulation 22 is positioned under the collector pan assembly 20 as seen in FIG. 1 and attached to the rafters RR. To simplify the insulation of the fluid receiver 89, the liquid pump 12 and the heat exchanger 14, studs SD may be positioned between the rafters RR and ceiling joists CJ as seen in FIG. 1 inboard of the equipment. Insulation 22 is then positioned between the studs SD and also between the ceiling joists CJ if they are not already insulated to define an insulated enclosure EN about the equipment.

Another feature of this invention is that any number of individual solar collectors 11 may be connected together in parallel and that the length of each collector may be easily changed or adjusted. In parallel operation, the heat transfer fluid 15 is supplied to supply headers 24 connected to distributing manifold 91 in parallel through an appropriate flow control valve (not shown). The flow control valves may be individually adjusted to balance the flow of heat transfer fluid across the array of solar collectors 11.

HEAT TRANSFER FLUID

The characteristics of the heat transfer fluid 15 are most important in the operation of a trickle-type solar collector such as that of this invention. Two basic criteria are required for optimum operation, (1) that the heat transfer fluid must substantially wet the entire solar radiation absorbing surface of the solar collector with a stable film and, (2) that the heat transfer fluid should not be vaporized in the operating temperature range of the collector.

Figure 20:
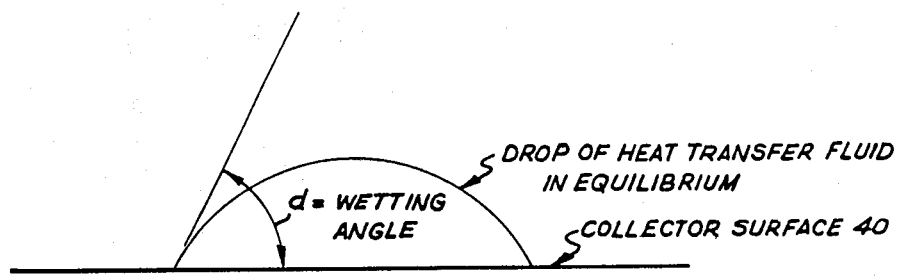
FIG. 20 is a schematic view illustrating wetting angle.

The ability of the heat transfer fluid to wet the solar heat absorbing surface of the solar collector has been found to be a function of wetting angle $\alpha$ and the dimensionless Reynolds number $R_e$ of the fluid flowing down the solar heat absorbing surface. Wetting angle $\alpha$ is the included angle defined by the edge of a drop of heat transfer fluid with a flat horizontal surface of the same material and finish as the solar heat absorbing surface 45 on the collector pan assembly 20 as seen in FIG. 20. Because the ability of the heat transfer fluid to wet or cover the surface 45 is dependent not only on the surface tension of the fluid but also on the material and the finish of the surface on which the fluid is supported, wetting angle $\alpha$ is the best indication of the wetting ability since it takes all of these factors into effect. Reynolds number $R_e$ is defined by equation:

$$R_e = \dot{m}/\mu$$

where:
$\dot{m}$ = fluid mass flow rate per unit width down the collector ($lb_m$/sec-ft)
$\mu$ = fluid viscosity ($lb_m$/ft-sec)

Figure 21:
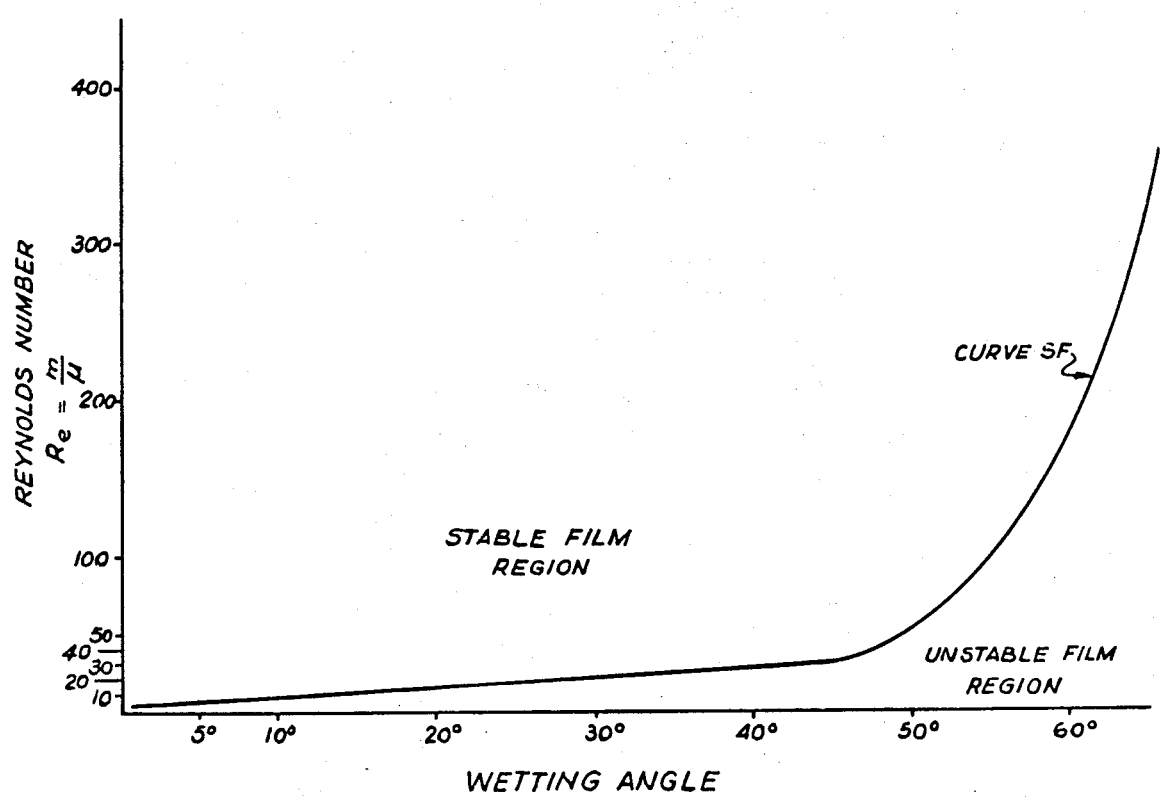
FIG. 21 is a graph illustrating the relationship between Reynold Number and wetting angle to maintain a stable heat transfer fluid film in a solar collector.

The relationship between Reynolds number $R_e$ and wetting angle is best illustrated in FIG. 21. The curve SF shown in FIG. 21 is a plot of the points at which a stable film of heat transfer fluid which completely covers the solar radiation absorbing surface is achieved. It will be noted that a fully stable unbroken fluid film is achieved in that area above curve SF while the fluid film below curve SF is not fully stable. Since the amount of heat transferred from the heated solar radiation absorbing surface 45 to the heat transfer fluid is maximized when a fully stable fluid film is present, one should keep the Reynolds number $R_e$ above curve SF in FIG. 21. On the other hand, the higher the Reynolds number $R_e$, the greater is the tendency of the fluid film to form waves or ripples therein that may result in the fluid splashing onto the other surfaces of the collector. This also results in lower collection efficiency and loss of usable heat transfer fluid. To minimize the formation of waves or ripples in the fluid film flowing down the solar radiation absorbing surface, it has been found that usually the Reynolds number $R_e$ should not exceed about 100 and should be as low as possible. From FIG. 21, it will be seen that curve SF starts rising at a rapidly increasing slope when the wetting angle $\alpha$ of the heat transfer fluid exceeds 50° and very quickly requires a Reynolds number $R_e$ greater than 100 to achieve a fully stable fluid film. Therefore, the wetting angle $\alpha$ of the heat transfer fluid 15 should not exceed 50° and preferably should be lower than 10°. It will further be noted that the stable fluid film criteria is independent of the tilt angle $A_1$.

If the heat transfer fluid 15 is heated sufficiently to be evaporated by the solar radiation absorbing surface 45, the evaporated fluid will then be subsequently condensed on the lower surface of the cover 21. This causes a high thermal heat loss from the solar radiation absorbing surface 45 to cover 21 for dissapation into the atmosphere through a heat pipe effect. The heat transfer fluid condensing on the back of cover 21 also partially blocks the incoming solar radiation from reaching the solar radiation absorbing surface 45 to further reduce the collection efficiency of the collector.

Figure 22:
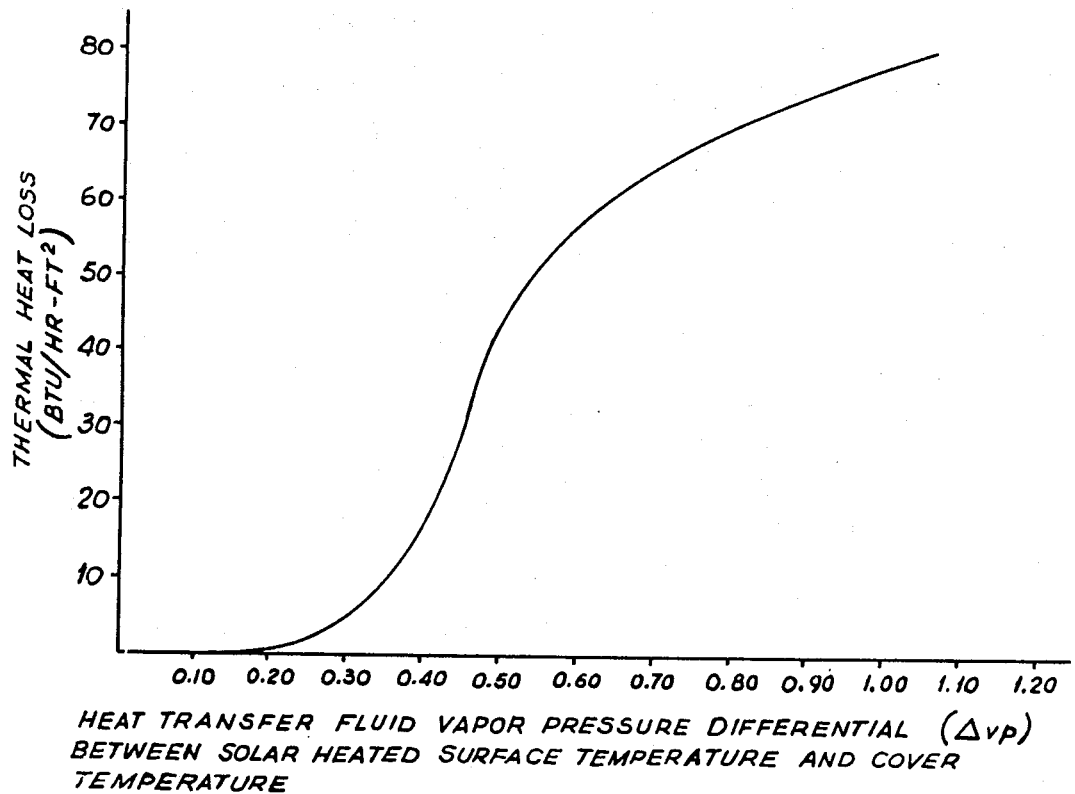
FIG. 22 is a graph illustrating the relationship between thermal heat loss and vapor pressure differential on the heat transfer fluid; and, FIG. 23 is a graph comparing the collection efficiency of the invention with the prior art.

The parameter which controls the thermal heat loss by evaporation and subsequent condensation on the cover is the difference between the heat transfer fluid vapor pressure at the highest temperature to which the heat transfer fluid is exposed and the lowest temperature to which the heat transfer fluid is exposed as it flows down the collector. The highest temperature for the collector illustrated is that of the solar radiation absorbing surface 45 while the lowest temperature is that of the inside surface of the cover 21 which directly overlies the heat transfer fluid as it flows down the surface 40. For sake of simplicity the difference in vapor pressures will be referred to hereinafter as the vapor pressure differential $\Delta_{VP}$ of the heat transfer fluid. The thermal heat loss $Q_{loss}$ by evaporation and condensation becomes significant when the vapor pressure differential $\Delta_{VP}$ of the heat transfer fluid exceeds about 0.3 psia as seen in FIG. 22. Thus, the vapor pressure differential $\Delta_{VP}$ should be less than about 0.3 psia and preferably should be less than about 0.15 psia.

Based on these criteria, it will be seen that the almost exclusively used prior art heat transfer fluid, water, does not meet the criteria set forth above. On the other hand, many mineral and synthetic fluids and oils, especially silicone fluids, meet these criteria. These fluids and oils may also be obtained which are desirably fire resistant, non-toxic, non-corrosive and have low oxidation characteristics.

The viscosity characteristics of the heat transfer fluid 15 are also important to the successful operation of the collector system of the invention. On the one hand, the viscosity of the heat transfer fluid must be sufficiently high at the maximum operating temperature of the collector system in order to maintain the Reynolds number sufficiently low to prevent undesirable waves and splashing in the fluid film. On the other hand, the viscosity of the heat transfer fluid must be sufficiently low at the coldest temperature associated with the collector system to allow the heat transfer fluid to be pumped without undesirably high pumping losses. The silicone fluids mentioned above are especially suited for the heat transfer fluid because of their very uniform viscosity-temperature characteristics. It is to be understood that any heat transfer fluid may be used which meets the above requirements as to wetting angle $\alpha$ and vapor pressure differential $\Delta_{VP}$. Usually, the heat transfer fluid 15 will have a viscosity range of about 0.0007-0.050 $lb_m$/ft-sec over the operating temperature range of the collector system.

Figure 23:
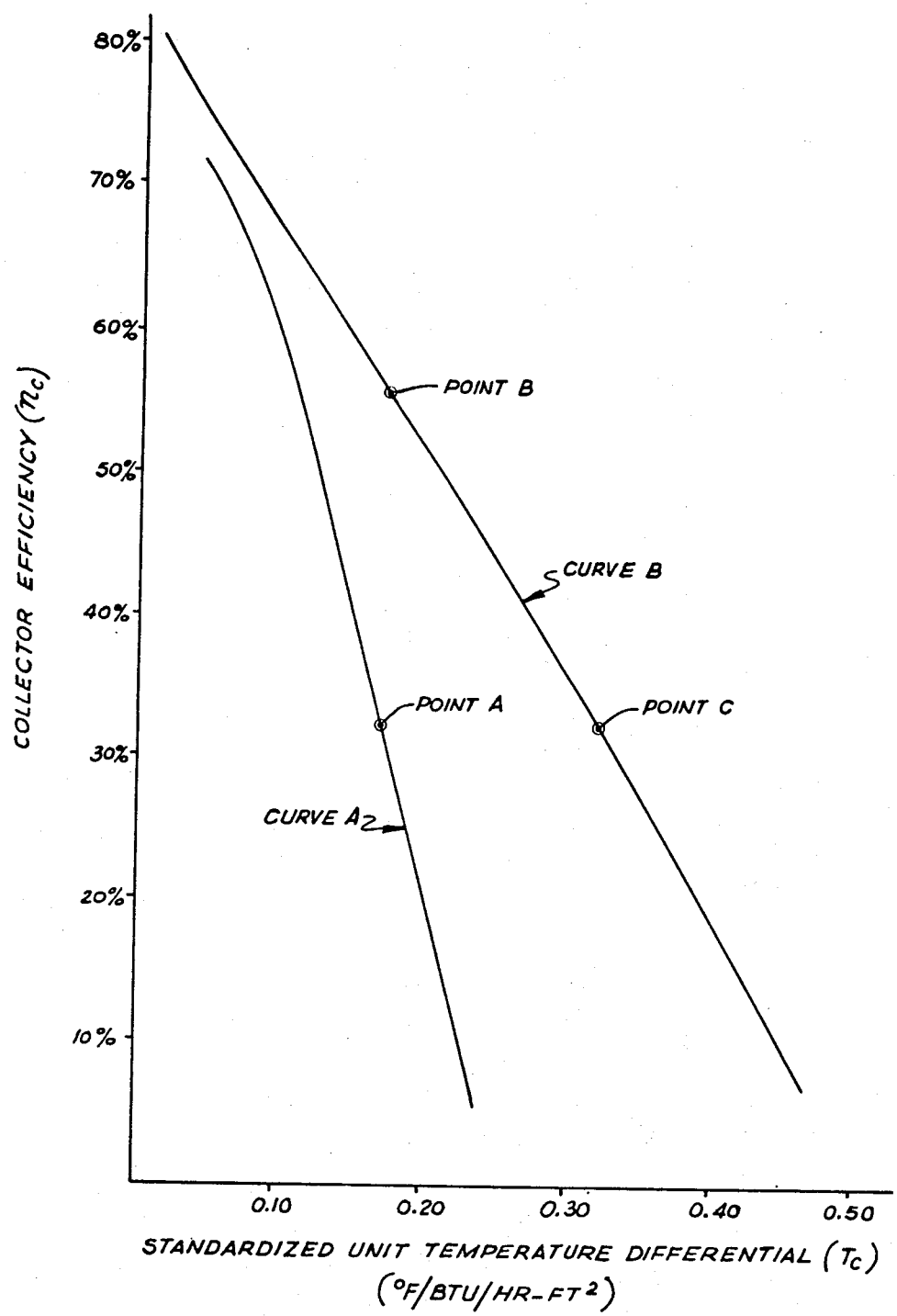

The resulting differences between the use of the prior art heat transfer fluid, water, and a heat transfer fluid 15 coming within the above criteria can best be illustrated by reference to FIG. 23 and attached Table I. The particular heat transfer fluid 15 selected for comparison is dimethyl silicone. In FIG. 23, Curve A indicates tha collection efficiency of water as the heat transfer fluid while Curve B indicates the collection efficiency of dimethyl silicone as the heat transfer fluid. The ordinate is the collection efficiency $\eta c$ and the abscissa is the standardized unit temperature differential $\tau c$ of the heat transfer fluid as it flows through the collector. The collection efficiency $\eta c$ is defined by:

$$\eta c = (\dot{Q}coll/Qsolar) \times 100$$

where
 $\dot{Q}coll$ = heat output of collector fluid (Btu/hr-ft$^2$)
 $Qsolar$ = Insolation = Solar radiation impressed on collector (Btu/hr-ft$^2$)

The standardized unit temperature differential $\tau c$ is defined by:

$$\tau c = \frac{T_{af} - T_{amb}}{Qsolar}$$

where
 $T_{af}$ = average heat tranfer fluid temperature as it flows over the length of the collector (° F)
 $T_{amb}$ = ambient air temperature (° F)

Because the heat transfer between the solar radiation absorbing surface 45 and the heat transfer fluid 15 in the collector 11 shown is good, the temperature $T_{af}$ is also the average temperature of the surface 45. The standardized unit temperature differential $\tau c$ allows the use of one curve even though the received solar radiation varies.

As seen in FIG. 23, the collection efficiency $\eta c$ using water as the heat transfer fluid is considerably lower than that using dimethyl silicone as the heat transfer fluid at the same value of the temperature differential $\tau c$. For instance, if the ambient temperature $T_{amb}$ is 50° F, the average heat transfer fluid temperature $T_{af}$ is 100° F and the received solar radiation Qsolar is 300 Btu/hr-ft$^2$, the standardized unit temperature differential $\tau c$ would be 0.167° F/Btu/hr-ft$^2$. Referring to FIG. 23, this value for the temperature differential $\tau c$ shows that water would have a collection efficiency $\eta c$ of only 32% at Point A on Curve A while dimethyl silicone has a collection efficiency of over 55% at Point B on Curve B. This would permit about a 42% reduction in collector area to supply the same quantity of heat output $\dot{Q}coll$ at the temperature $T_{coll}$ or temperature differential $\tau c$ given.

On the other hand, the same efficiency can be achieved with dimethyl silicone as can be achieved with water but at a much higher average heat transfer fluid temperature $T_{af}$. For itstance, in the above example where the ambient temperature $T_{amb}$ is about 50° F and the insolation Qsolar is about 300 Btu/hr-ft$^2$, the collection efficiency could be maintained at about 32%, the same as water, with the average heat transfer fluid temperature $T_{af}$ at about 145° F as shown by Point C on Curve B using dimethyl silicone or an increase of about 45% in the output temperature of the heated dimethyl silicone. It will further be noted that water reaches a collection cutoff value (i.e. where $\eta c \approx 0$) at a much lower value of temperature differential $\tau c$ then the heat transfer fluid 15 of the invention.

The equipment which the solar collector is driving determines the required output temperature in the heat transfer fluid. In some cases, the output temperature can be relatively low thus permitting a higher percentage of the incoming solar radiation to be collected by the dimethyl silicone at the same temperature as is available from water. Where the output temperature must be high such as is the case with absorption type refrigeration or air conditioning systems, the same efficiency as is available with water can be obtained with dimethyl silicone but at a much higher temperature.

Figure 13:
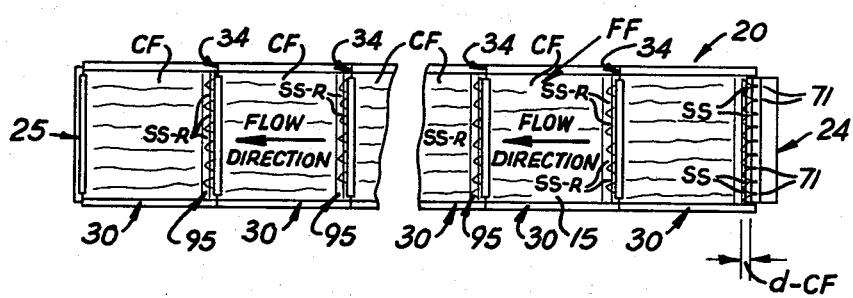
FIG. 13 is a reduced top view of the solar collector illustrating the flow of the heat transfer fluid thereover.

The formation of the film of heat transfer fluid 15 which meets the above requirements is illustrated in FIG. 13. The heat transfer fluid 15 is discharge in separate streams SS from the outlet ports 71 in the supply header 24 onto the solar radiation absorbing surface 45 in the upper end of the fluid flow channel 35. These separate streams SS rapidly spread out to become a continuous film CF within a prescribed distance d-CF downstream of the header 24. This distance d-CF is usually a few inches. When the continuous film CF strikes one of the ribs 55, it is sub-divided into separate streams SS-R by the attachment sections 60 in the web 56 of rib 55 so that all of the heat transfer fluid 14 passes through the cutouts 59 in the rib 55. The separate streams SS-R downstream of rib 55 again rapidly spread out to reform the continuous film CF as the fluid continues to flow down the collector. Thus, the solar radiation absorbing surface 45 is virtually completely covered by the film of heat transfer fluid 15. Any speed-balls SB formed at the ribs 55 will be dispersed by the speed-ball trap 95 immediately downstream thereof.

Because the heat generated at surface 45 by the absorbed solar radiation is readily transferred to the heat transfer fluid 15 flowing thereover, the temperature of the fluid is usually substantially equal to the temperature of surface 45. Under usual operating temperatures, the temperature of the heat transfer fluid 15 as it exits the collector may range from about 70° F to about 170° F depending on the temperature required to drive the equipment associated with the collector system and the amount of solar insolation. To maintain good efficiency of operation the temperature differential between the inlet and outlet temperatures of the heat transfer fluid may vary from about 10° F to about 50° F.

Where the solar radiation is absorbed by the surface 45 and then transferred to the heat transfer fluid 15 from surface 45, the film of heat transfer fluid flowing down the fluid flow channel 35 over the heat absorbing surfaces 45 should be sufficiently thick to absorb the heat generated by the incident solar insolation but not so thick as to cause splashing of the heat transfer fluid. This film thickness is usually less than about 0.25 inch and typically is about 0.025 inch.

On the other hand, the heat transfer fluid itself may be capable of absorbing the solar radiation to heat the fluid directly. Where the fluid absorbs the solar radiation directly, it would not be necessary to make the surface 45 highly absorbent to solar radiation. This feature may be desirable, especially where the collector has idle times in which the heat transfer fluid is not being pumped onto the surface 45 and the surface 45 is being exposed to solar radiation without being cooled by the heat transfer fluid. An uncooled, dark solar radiation absorbing surface 40 may reach sufficiently high temperatures to undesirably degrade collector components since temperatures in excess of 250° F can be reached. By using a solar radiation absorbing heat transfer fluid, the surface 45 may be left bright to reflect or re-radiate a large portion of the solar radiation back out of the collector when it is not covered by the heat transfer fluid and thus reduce the idle temperature of surface 45. When the surface 45 is again covered by the solar radiation absorbing heat transfer fluid, the reflected or re-radiated solar radiation will be blocked and the solar radiation absorbed by the heat transfer fluid. The heat transfer fluid may be made absorbent to solar radiation in a number of different ways. One technique that is satisfactory is to mix carbon black in the fluid.

Practically, it is preferably to maintain the maximum temperature of the heat transfer fluid as low as possible to reduce thermal heat losses. Ideally, the heat transfer fluid should either absorb therein or transmit therethrough to surface 45 substantially all of the recieved solar heat thereon while at the same time not thermally radiate the heat therefrom in order to maximize the retained heat in the heat transfer fluid.

TABLE I

| HEAT TRANSFER FLUID: | WATER | DIMETHYL SILICONE |
|---|---|---|
| Flow rate (m): | 0.067 lb$_m$/sec-ft | 0.644 lb$_m$/sec-ft |
| Tilt angle (A$_1$): | 45° | 45° |
| Wetting angle ($\alpha$): | 65° | Approximately 0° |
| Viscosity ($\mu$): | 0.00046 lb$_m$/ft-sec at 100° F | 0.054 lb$_m$/ft-sec at 100° F |
| Vapor pressure differential ($\tau c$): | 0.77 psia at 100° F | Below 0.01 psia at 100° F |
| Reynolds number (R$_e$): | 146 at 100° F | 12 at 100° F |

What is claimed is:

1. A modular solar collector system for installation on the spaced apart, generally parallel rafters in a building to expose heat transfer fluid to solar radiation including a collector pan assembly adapted to fit in the opening between and be attached to the opposed inside edges of the adjacent building rafters said collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan; each of said side walls including a mounting leg flexibly movable with respect to said bottom wall; each of said collector pans having a transverse width such that said collector pan can be positioned in the opening between the building rafters and at least a portion of said mounting leg of each of said side walls can be forced into juxtaposition with one of the opposed inside edges of the adjacent building rafters and attached thereto to mount said collector pan within the opening between the building rafters, the upstream end of said collector pan having a prescribed exterior size and shape and the downstream end of said collection pan having a prescribed interior size and shape complimentary to said upstream exterior shape, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan.

2. The modular solar collector system of claim 1 further including supply header means for supplying the heat transfer fluid to the common fluid flow channel so that the heat transfer fluid can flow down the common fluid flow channel serially over said overlapped bottom walls of said collector pans under the force of gravity.

3. The modular solar collector system of claim 2 further including return header means for collecting the heat transfer fluid after the heat transfer fluid has flowed down the common fluid flow channel.

4. The modular solar collector system of claim 3 further including at least one cover member extending over the common fluid flow channel, said cover member capable of transmitting solar radiation therethrough into said fluid flow channel.

5. A modular solar collector system for use in exposing a heat transfer fluid to solar radiation including a collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan, each of said side walls of each of said collector pans having a generally inverted V-shaped cross-section and including an inboard leg; an outboard leg; and an apex section joining said inboard leg with said outboard leg, that side of said inboard leg opposite said apex section connected to the side of said bottom wall, said outboard leg having an effective height greater than said inboard leg so that a portion of said outboard leg depends below said bottom wall to be used to mount said collector pan, the upstream end of said collector pans having a prescribed exterior size and shape and the downstream end of each of said collector pans having a prescribed interior size and shape complimentary to said upstream exterior shape, said side wall having an exterior size and shape at the upstream end of said collector pan and an interior size and shape at the downstream end of said collector pan so that said side wall at the downstream end of each of said collector pans will complimentarily overlap said side wall at the upstream end of another of said collector pans, said plurality of collector pans serially connected together with the downstream end of each of said collector pan overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan.

6. A modular solar collector system for use in exposing a heat transfer fluid to solar radiation including a collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan, each of said collector pans further including an upstanding, generally transversely extending support rib integral with said bottom wall at the downstream end of said collector pan and projecting into said fluid flow channel, said support rib serving to maintain said bottom wall substantially flat at the downstream end of said collector pan, and said support rib defining a plurality of fluid openings therethrough at the juncture of said rib and said bottom wall so that the heat transfer fluid can flow down the fluid flow channel and through said fluid openings, the upstream end of each of said collector pans having a prescribed exterior size and shape and the downstream end of each of said collector pans having a prescribed interior size and shape complimentary to said upstream exterior shape, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan.

7. The modular solar collector system of claim 6 wherein each of said collector pans further includes a generally transversely extending reinforcing section integral with said bottom wall adjacent the upstream end of said collector pan and depending below said bottom wall, said reinforcing section serving to maintain said bottom wall substantially flat at the upstream end of said collector pan.

8. A modular solar collector system for use in exposing a heat transfer fluid to solar radiation including:
 a collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan, the upstream end of said collector pan having a prescribed exterior size and shape and the downstream end of said collection pan having a prescribed interior size and shape complimentary to said upstream exterior shape, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan; and, supply header means for supplying the heat transfer fluid to the common fluid flow channel so that the heat transfer fluid can flow down the common fluid flow channel serially over said overlapped bottom walls of said collector pans under the force of gravity, said supply header means including a discharge connector connecting said supply header means to said bottom wall at the upstream end of one of said collector pans, said discharge connector defining an air gap upstream of the upstream point of contact between the heat transfer fluid and said bottom wall to prevent capillary attraction from forcing the heat transfer fluid between said collector pan bottom wall and said discharge connector.

9. A modular solar collector system for use in exposing a heat transfer fluid to solar radiation including a collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan, the upstream end of said collector pan having a prescribed exterior size and shape and the downstream end of said collection pan having a prescribed interior size and shape complimentary to said upstream exterior shape, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan, each of said collector pans further including spacer means defining an air gap between the overlapped bottom walls of said collector pans to prevent capillary attraction from forcing the heat transfer fluid between the overlapped bottom walls of said collector pans.

10. A modular solar collector system for use in exposing a heat transfer fluid to solar radiation and adapted to fit in the opening between and attached to the opposed inside edges of spaced apart, generally parallel rafters in a building roof structure including a collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a bottom wall over which the heat transfer fluid can flow in a thin fluid film and a pair of side walls along opposite sides of said bottom wall so that said side walls and said bottom wall define a pan fluid flow channel along the length of said collector pan; each of said side walls of each of said collector pans having a generally inverted V-shaped cross-section and including an inboard leg; an outboard leg; and an apex section joining said inboard leg with said outboard leg, that side of said inboard leg opposite said apex section connected to the side of said bottom wall, said outboard leg having an effective height greater than said inboard leg so that a portion of said outboard leg depends below said bottom wall, said outboard leg flexibly movable with respect to said bottom wall, the upstream end of said collector pan having a prescribed exterior size and shape and the downstream end of said collection pan having a prescribed interior size and shape complimentary to said upstream exterior shape, each of said side walls having an exterior size and shape at the upstream end of said collector pan and an interior size and shape at the downstream end of said collector pan so that said side wall at the downstream end of each of said collector pans complimentarily overlaps said side wall at the upstream end of another of said collector pans, and each of said collector pans having a transverse width such that said collector pan can be positioned in the opening between the rafters and at least a portion of said outboard leg of each of said side walls depending below said bottom wall can be forced into juxtaposition with one of the opposed inside edges of the rafters and attached thereto to mount said collector pan within the opening between the rafters, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan.

11. The modular solar collector system of claim 10 wherein each of said collector pans further includes an upstanding, generally transversely extending support rib integral with said bottom wall at the downstream end of said collector pan and projecting into said fluid flow channel, said support rib serving to maintain said bottom wall substantially flat at the downstream end of said collector pan, and said support rib defining a plurality of fluid openings therethrough at the juncture of said rib and said bottom wall so that the heat transfer fluid can flow down the fluid flow channel and through said fluid openings.

12. The modular solar collector system of claim 11 further including supply header means for supplying the heat transfer fluid to the common fluid flow channel so that the heat transfer fluid can flow down the common fluid flow channel over said bottom walls of said collector pans under the force of gravity.

13. The modular solar collector system of claim 12 further including return header means for collecting the heat transfer fluid after the heat transfer fluid has flowed down the common fluid flow channel.

14. The modular solar collector system of claim 13 further including at least one cover member extending over the common fluid flow channel, said cover member capable of transmitting solar radiation therethrough into said fluid flow channel.

15. The modular solar collector system of claim 14 wherein said supply header means includes a discharge connector connecting said supply header means to said bottom wall at the upstream end of one of said collector pans, said discharge connector defining an air gap upstream of the upstream point of contact between the heat transfer fluid and said bottom wall to prevent capillary attraction from forcing the heat transfer fluid between said collector pan bottom wall and said discharge connector.

16. The modular solar collector system of claim 15 wherein each of said collector pans further includes a generally transversely extending reinforcing section in said bottom wall at the upstream end of said collector pan depending below said bottom wall, said reinforcing section serving to maintain said bottom wall substantially flat at the upstream end of said collector pan.

17. The modular solar collector system of claim 15 wherein each of said collector pans further includes spacer means defining an air gap between the overlapped bottom walls of said collector pans to prevent capillary attraction from forcing the heat transfer fluid between the overlapped bottom walls of said collector pans.

18. A one-piece solar collector pan construction for use in exposing a heat transfer fluid to solar radiation and adapted to fit in the opening between and attached to the opposed inside edges of spaced apart frame members comprising:
   a generally rectilinear flat bottom wall having a central pan axis, opposed side edges, an upstream end and a downstream end;
   a pair of opposed side walls integral with the opposed side edges of said bottom wall defining a fluid flow channel over said bottom wall, each of said side walls including a mounting leg flexibly connected to said bottom wall so that at least an attachment portion of said mounting leg can be moved with respect to said bottom wall, said bottom wall and said side walls having a combined width transverse of said pan central axis such that said collector pan can be positioned in the opening between adjacent frame members and at least said attachment portion of said mounting legs can be forced in juxtaposition with the opposed inside edges of the frame members and attached thereto to mount said solar collector pan construction within the opening between the frame members; and
   a generally transversely extending support rib integral with the downstream end of said bottom wall and extending upwardly therefrom generally normal to said bottom wall and into said fluid flow channel, said support rib defining a plurality of fluid flow openings therethrough at its juncture with said bottom wall so that heat transfer fluid may flow through said fluid flow openings, said support rib maintaining said bottom wall substantially flat at its downstream end.

19. The collector pan construction of claim 18 further including a generally transversely extending reinforcing dimple integral with the upstream end of said bottom wall and depending below said flat bottom wall to maintain said bottom wall substantially flat at its upstream end.

20. The collector pan construction of claim 19 wherein each of said side walls has a generally inverted V-shape cross-section and further includes an inside leg, and an apex section joining said inside leg with said mounting leg; said inside leg joined with one side of said flat bottom wall and having a length less than said mounting leg so that said attachment portion of said mounting leg depends below said flat bottom wall for attachment to said frame members.

21. The collector pan construction of claim 20 wherein said inside leg and said mounting leg of each of said side walls angle away from each other in a direction away from said apex section so that said collector pan construction can be stacked.

22. The collector pan construction of claim 21 wherein each of said side walls has an upstream end and a downstream end, said side wall having a prescribed interior shape at its downstream end and a complimentary prescribed exterior shape at its upstream end so that a plurality of said collector pans can be serially overlapped.

23. A solar collector system for use in exposing a heat transfer fluid to solar radiation including:
   a collector pan assembly including a bottom wall and defining a fluid flow channel therein over said bottom wall, said bottom wall inclined with respect to the horizontal at a prescribed inclination angle so that the heat transfer fluid can flow down said bottom wall in the fluid flow channel under the force of gravity;
   supply header means for supplying the heat transfer fluid to the fluid flow channel so that the heat transfer fluid can flow along the fluid flow channel over said bottom wall under the force of gravity; and,
   discharge connector means connecting said supply header means to said bottom wall of said collector pan assembly, said discharge connector means defining an air gap upstream of the upstream point of contact between the heat transfer fluid and said bottom wall to prevent capillary attraction from forcing the heat transfer fluid between said collector pan assembly bottom wall and said discharge connector means.

24. A fluid supply header for distributing a heat transfer fluid onto a flow surface in a fluid flow channel of a solar collector for flow of the heat transfer fluid along the fluid flow channel under the influence of gravity comprising an elongate tubular member including a tubular side wall defining a fluid reservoir therein and a plurality of fluid discharge ports therethrough, opposite ends of said side wall folded back within said side wall to close said tubular member and form said fluid reservoir; and a discharge ledge under said fluid discharge ports having a projecting edge and over which the heat transfer fluid is discharged, said discharge ledge including a contact lip along said projecting edge for engaging the flow surface in the solar collector to define an air gap upstream of said projecting edge of said discharge ledge to prevent capillary attraction from forcing the heat transfer fluid back up under said discharge ledge.

25. A method of fabricating a fluid supply header for distributing a liquid heat transfer fluid in a solar collector comprising:
   (a) forming an elongate tubular member having a substantially constant cross-sectional shape with a side wall defining a central passage therethrough opening onto the opposite ends of the tubular member;
   (b) forming a plurality of discharge openings through the side wall of the tubular member spaced along a path generally parallel to the central axis of the tubular member;
   (c) forming an inlet opening through the side wall of the tubular member intermediate the ends of the tubular member and circumferentially shifted around the side wall of the tubular member from the discharge openings; and,
   (d) folding each of the opposite ends of the side wall of the tubular member back within itself beginning at a point just outboard of the inlet opening and in increasing amounts axially along the tubular member from the beginning point out to the end of the side wall so that the inside surface of the inwardly folded portion of the side wall abuts the inside surface of the unfolded portion of the side wall in the vicinity of the end of the tubular member to close the central passage at the opposite ends of the tubular member and form a fluid reservoir in the tubular member which has a decreasing cross-sectional size from the beginning point of each inwardly folded portion of the side wall axially outward along the inwardly folded portion of the side wall to the end of the tubular member.

26. The method of claim 25 wherein step (a) includes extruding the tubular member and cutting opposite ends of the extruded tubular member at an angle to cause the ends of the side wall of the tubular member to align when the side wall is folded back within itself.

27. A modular solar collector system for use in exposing a heat transfer fluid to solar radiation including a collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan, the upstream end of said collector pan having a prescribed exterior size and shape and the downstream end of said collection pan having a prescribed interior size and shape complimentary to said upstream exterior size and shape, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan; and further including means operatively associated with the downstream end of each of said collector pans for preventing any droplets of heat transfer fluid formed at the downstream end of each of said collector pans from flowing down the bottom wall of the next downstream collector pan as individual droplets.

28. A modular solar collector system for use in exposing a heat transfer fluid to solar radiation including a collector pan assembly defining a common fluid flow channel therein inclined with respect to the horizontal at a prescribed inclination angle so that the heat transfer fluid can flow down the fluid flow channel under the force of gravity, said collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan, the upstream end of said collector pan having a prescribed exterior size and shape and the downstream end of said collection pan having a prescribed interior size and shape complimentary to said upstream exterior size and shape, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan; each of said collector pans further including trapping means on said bottom wall and extending into said fluid flow channel, said trapping means located on said bottom wall adjacent the upstream end of said collector pan and downstream of the downstream end of the next upstream overlapping collector pan, and said trapping means constructed and arranged to prevent any droplets of heat transfer fluid formed at the downstream end of the next upstream overlapping collector pan from flowing dow the fluid film on the bottom wall of said collector pan without absorption of the droplets into the fluid film.

29. The modular solar collector system of claim 28 wherein said trapping means includes an inverted V-shaped section formed in said bottom wall of each of said collector pans, said inverted V-shaped section including an upstream leg and a downstream leg so that the heat transfer fluid flowing along said bottom wall flows over said upstream leg and said downstream leg as a continuous film with the fluid film flowing down the bottom wall, said upstream leg of said inverted V-shaped section causing a trapping subsurface to be formed on the film of heat transfer fluid flowing thereover oriented so that any droplets of heat transfer fluid formed at the downstream end of the next upstream collector pan will be retained on said trapping subsurface for a sufficient period of time for the droplets of heat transfer fluid to be absorbed in the film of heat transfer fluid flowing over said upstream leg.

30. A modular solar collector system for use in exposing a heat transfer fluid to solar radiation including a collector pan assembly defining a common fluid flow channel therein inclined with respect to the horizontal at a prescribed inclination angle so that the heat transfer fluid can flow down the fluid flow channel under the force of gravity, so collector pan assembly comprising a plurality of collector pans; each of said collector pans having an upstream end and a downstream end, and comprising a generally flat bottom wall over which the heat transfer fluid can flow in a thin fluid film and a pair of side walls along opposite sides of said bottom wall so that said side walls and said bottom wall define a pan fluid flow channel along the length of said collector pan, the upstream end of said collector pan having a prescribed exterior size and shape and the downstream end of said collection pan having a prescribed interior size and shape complimentary to said upstream exterior size and shape, said plurality of collector pans serially connected together with the downstream end of each of said collector pans overlapping the upstream end of another of said collector pans immediately downstream thereof with the downstream interior shape of each said collector pan complimentarily fitting over the upstream exterior shape of the next downstream said collector pan so that the pan fluid flow channels are serially connected to form said common fluid flow channel and to prevent leakage of said heat transfer fluid as said heat transfer fluid flows from the downstream end of each said collector pan onto the upstream end of the next downstream said collector pan; and further including pooling means associated with the downstream end of each of said collector pans for forming a pool in the heat transfer fluid flowing down the bottom wall of the next downstream collector pan in contact with the downstream end of the bottom wall of said collector pan.

31. A fluid supply header assembly for distributing a liquid heat transfer fluid onto a flow surface in a fluid flow channel of a solar collector for flow of the heat transfer fluid along the fluid flow channel under the influence of gravity comprising an elongate tubular member defining a liquid reservoir therein with an upper portion and a lower portion and a plurality of liquid discharge ports therethrough in communication with the upper portion of said liquid reservoir through which the liquid heat transfer fluid in said reservoir is discharged so that a pool of the liquid heat transfer fluid is maintained in said liquid reservoir below said discharge ports, said liquid discharge ports arranged along a generally horizontal path and spaced from each other along the length of said tubular member and means for introducing the liquid heat transfer fluid into said liquid reservoir below said discharge ports to raise the level of the pool of the liquid heat transfer fluid in said liquid reservoir sufficiently to cause the liquid heat transfer fluid to flow from said liquid reservoir out through said plurality of discharge ports, said liquid reservoir having a decreasing cross-sectional size axially along the length thereof from the point of injection of the liquid heat transfer fluid into said reservoir toward the opposite ends thereof.

32. The fluid supply header assembly of claim 31 wherein said tubular member includes a circumferentially endless side wall having an inside surface defining said liquid reservoir, said side wall having a prescribed length axially along said tubular member and opposite ends, each of the opposite ends of said side wall folded back within itself beginning at a point just outboard of the point of injection of the liquid heat transfer fluid and in increasing amounts axially along said tubular member from the beginning point out to the end of said side wall so that the inside surface of the inwardly folded portion of said side wall abuts and is in juxtaposition with the inside surface of the unfolded portion of said side wall in the vicinity of the end of said tubular member to close said reservoir and to form the decreasing cross-sectional size of said reservoir.

33. A method of operating a solar collector which includes a plurality of collector pans serially connected so that heat transfer fluid flows serially over collector pans by flowing over the downstream end of each collector pan onto the upstream end of the next downstream collector pan with a tendency to form droplets of heat transfer fluid at the downstream end of each collector pan where the droplets flow down the surface of the film of heat transfer fluid onto the next downstream collector pan without being completely absorbed thereinto so as to cause splashing comprising the steps of:
  forming a trapped subsurface in the fluid film immediately downstream of the downstream end of each of the collector pans onto which the droplets of heat transfer fluid must pass as they are formed at the downstream end of the collector pan; and,
  retaining the droplet of heat transfer fluid on the trapping subsurface in the fluid film for a sufficient length of time for the droplets of heat transfer fluid to be absorbed into the fluid film without splashing.

34. The method of claim 33 further including the steps of locating the trapping subsurface so that the droplets of heat transfer fluid formed at the downstream end of each collector pan fall generally vertically onto the trapping subsurface.

35. The method of claim 34 wherein the trapping subsurface is substantially horizontal to minimize the velocity of the droplets over the trapping subsurface.

36. A modular solar collector system defining a common fluid flow channel of any desired incremental length inclined with respect to the horizontal along which a heat transfer fluid is flowed under the force of gravity to expose the heat transfer fluid to solar radiation; said collector system comprising:
  a plurality of collector pans which fit together to cumulatively form the common fluid flow channel, each of said collector pans having an upstream end, a downstream end, and a pan length less than the desired incremental length of the common fluid flow channel; each of said collector pans defining an open top pan fluid flow channel along the length thereof and a channel bottom surface over which the heat transfer fluid flows, the downstream end of each of said collector pans having the same prescribed exterior size and shape and the upstream end of each of said collector pans having the same prescribed interior size and shape conforming to the exterior size and shape of the downstream end of said collector pan so that the downstream end of each of said collector pans will overlap and conform to the upstream end of another of said collector pans, said plurality of collector pans generally coaxially aligned along a common prescribed angle of inclination with respect to the horizontal and axially shifted with respect to each other so that the downstream end of each of said collector pans, with the exception of the downstreammost of said collector pans, overlaps the upstream end of another of said collector pans immediately downstream thereof with the exterior of the downstream end of said collector pan conforming to the interior of the upstream end of said collector pan immediately downstream thereof so that the effective cumulative length of the overlapped said collector pan is the desired incremental length of the common fluid flow channel and so that said open top fluid flow channels in said collector pans cumulatively form said common fluid flow channel whereby the heat transfer fluid flows along the channel bottom surface of each of the overlapped said collector pans and out over the downstream end of each of the channel bottom surfaces onto the channel bottom surface immediately downstream thereof;

fluid supply means for discharging the heat transfer fluid into the common fluid flow channel in the upstreammost said collector pan;

fluid collection means for collecting the heat transfer fluid from the downstream end of the downstreammost said collector pan; and, solar radiation transmitting cover means extending across the open top pan fluid flow channels to close same.

37. The modular solar collector system of claim 36 wherein said collector pans are constructed and arranged to form an air gap between the downstream end of each said collector pan and the upstream end of said collector pan immediately downstream thereof overlapped by the downstream end to prevent capillary attraction from forcing the heat transfer fluid between the overlapped portions of said collector pans.

38. The modular solar collector system of claim 36 further including trapping means operatively associated with the heat transfer fluid flowing from the downstream end of the channel bottom surface on each said collector pan onto the overlapped channel bottom surface on said collector pan immediately downstream thereof for preventing any droplets of heat transfer fluid formed at the downstream end of the channel bottom surface from flowing down the next downstream channel bottom surface as individual droplets.

39. The modular solar collector system of claim 36 further including pooling means operatively associated with the downstream end of the channel bottom surface of each said collector pan overlapping the upstream end of the channel bottom surface of another of said collector pans and forming a pool of the heat transfer fluid on the overlapped channel bottom surface in contact with the downstream end of the overlapping channel bottom surface.

40. The modular solar collector system of claim 36 wherein said fluid collection means includes a return header including an upstream wall and a downstream wall and defining a fluid return passage therethrough between said upstream wall and said downstream wall, said return header operatively associated with the downstream end of the downstreammost of said collector pans so that the downstream end of the channel bottom surface extends over said upstream wall of said return header, said return header further including abutment means abutting the downstream end of the downstreammost of said collector pans to positively locate the downstream end of the channel bottom surface of said collector pan in said fluid return passage and prevent the downstream end of said collector pan from abutting said downstream wall of said return header so that the heat transfer fluid flows over the downstream end of the channel bottom surface into said fluid return passage.

41. The modular solar collector system of claim 40 wherein said fluid collection means further includes receiver means defining a fluid receiving chamber therein operatively associated with the downstream end of said fluid return passage through said return header receiving the heat transfer fluid flowing through said return header, and a dispersion member within said receiving chamber projecting above the heat transfer fluid carried in said receiving chamber so that the heat transfer fluid discharged into said receiving chamber in said receiver means from said return header strikes said dispersion member to prevent splashing of the heat transfer fluid.

42. A method of installing a plurality of collector pans between spaced apart roof rafters to cumulatively form a solar collector assembly defining a common fluid flow channel along the length of the collector assembly along which a heat transfer fluid can flow under the influence of gravity to be heated by exposure to solar radiation where each of the collector pans has a bottom wall and a pair of spaced apart side walls with a length less than the overall desired length of the common fluid flow channel and with the exterior size and shape of the downstream end of each of the collector pans conforming to the interior size and shape of the upstream end of each of the collector pans comprising the steps of:

positioning a first of the collector pans between the roof rafters and connecting the collector pan to the roof rafters so that heat transfer fluid will flow along the upper surface of the bottom wall of the collector pan from its upstream end toward its downstream end under the force of gravity;

positioning another of the collector pans between the roof rafters and connecting the collector pan to the roof rafters so that heat transfer fluid will flow along the upper surface of the bottom wall of the collector pan from its upstream end toward its downstream end under the force of gravity and so that the upstream end of one of the so positioned collector pans is overlapped by the downstream end of the other of the collector pans with the overlapped bottom walls of the collector pans in juxtaposition with each other so that the heat transfer fluid flows over the downstream end of the overlapping bottom wall onto the overlapped bottom wall to continue its flow down the fluid flow channel under the force of gravity; and, continuing to position other collector pans between the roof rafters and connecting each pan to the roof rafters so that heat transfer fluid will flow along the upper surface of the bottom wall of each collector pan from its upstream end toward its downstream end under the force of gravity and so that the downstream end of each collector pan overlaps the upstream end of the collector pan immediately downstream thereof with the overlapped bottom walls of the collector pans in juxtaposition with each other so that the heat transfer fluid flows over the downstream end of the overlapping bottom wall onto the overlapped bottom wall to continue its flow down the fluid flow channel under the force of gravity until a common fluid flow channel is formed of the desired length.

43. The method of claim 42 wherein the steps of positioning each of the collector pans after the first collector pan has been positioned includes forming an air gap between the overlapping bottom walls to prevent capillary attraction from forcing the heat transfer fluid between the overlapped bottom walls of the collector pans and out of the fluid flow channel.

44. A method of operating a solar collector made up of a plurality of overlapping collector pans to form a common fluid flow channel comprising the steps of:

causing a heat transfer fluid to flow serially down the collector pans under the force of gravity so that the heat transfer fluid flows over the downstream ends of the collector pans onto the upstream ends of the next downstream collector pan; and, causing a pool of heat transfer fluid to form at the downstream end of the overlapping collector pans in contact with the downstream end of the overlapping collector pans to prevent the formation of droplets of heat transfer fluid at the downstream end of the overlapping collector pans which tend to flow down the surface of the heat transfer fluid flowing down the next downstream collector pan without being completely absorbed.

* * * * *